(12) United States Patent
Weising

(10) Patent No.: US 9,557,814 B2
(45) Date of Patent: Jan. 31, 2017

(54) BIOMETRIC INTERFACE FOR A HANDHELD DEVICE

(75) Inventor: George Weising, Culver City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 777 days.

(21) Appl. No.: 12/963,594

(22) Filed: Dec. 8, 2010

(65) Prior Publication Data

US 2011/0260830 A1     Oct. 27, 2011

Related U.S. Application Data

(60) Provisional application No. 61/326,747, filed on Apr. 22, 2010.

(51) Int. Cl.
*G08B 29/00*     (2006.01)
*G06F 3/01*     (2006.01)
(Continued)

(52) U.S. Cl.
CPC ............. *G06F 3/015* (2013.01); *A63F 13/20* (2014.09); *A63F 13/40* (2014.09); *A63F 13/60* (2014.09);
(Continued)

(58) Field of Classification Search
CPC .............. A63F 2300/5553; A63F 13/10; A63F 2300/204; A63F 2300/1012; A63F 2300/65; A63F 13/20; A63F 13/21; A63F 13/212; A63F 13/218; A63F 13/22; A63F 13/23; A63F 13/40; A63F 13/42; A63F 13/422; A63F 13/428; A63F 13/60; A63F 13/63; G06K 9/00885; G06F 17/30032; G06F 3/011; G06F 3/014; G06F 3/015; G07F 17/3204; G07F 17/3206; G07F 17/3227; H04N 21/42201
(Continued)

(56) References Cited

U.S. PATENT DOCUMENTS 4,683,891 A  *   8/1987   Cornellier et al. ........... 600/301
4,710,873 A  *   12/1987   Breslow et al. ................ 463/31
(Continued)

FOREIGN PATENT DOCUMENTS

WO     03/032142     4/2003     ............ G06F 3/033
WO     2009/037654     3/2009

OTHER PUBLICATIONS

Notification Concerning Transmittal of International Preliminary Report on Patentability, and Written Opinion of the International Searching Authority issued in PCT Application No. PCT/US2011/024723, mailed Nov. 1, 2012 (6 total pages).

*Primary Examiner* — Ryan Sherwin
(74) *Attorney, Agent, or Firm* — Martine Penilla Group, LLP

(57) ABSTRACT

Methods and systems for applying biometric data to an interactive program executed by a portable device are provided. According to embodiments of the invention, raw bio-signal data is captured and filtered so as to determine the bio-signal of the user of the interactive program. The bio-signal is analyzed so as to determine biometrics of the user, which are applied as input to the interactive program. A setting or state of the interactive program is modified based on the biometrics. An updated state of the interactive program is rendered to the user, reflecting the modification of the setting or state of the interactive program.

22 Claims, 23 Drawing Sheets

(51) Int. Cl.
  *G07F 17/32* (2006.01)
  *A63F 13/20* (2014.01)
  *A63F 13/60* (2014.01)
  *A63F 13/40* (2014.01)
  *A63F 13/63* (2014.01)
(52) U.S. Cl.
  CPC ........... *A63F 13/63* (2014.09); *G07F 17/3204* (2013.01); *G07F 17/3206* (2013.01)
(58) Field of Classification Search
  USPC ..... 713/186; 463/1–47; 380/251; 379/93.13; 340/5.52, 5.82–5.84, 4.3, 12.1, 13.1, 13.2, 340/13.37
  See application file for complete search history.

(56) References Cited

U.S. PATENT DOCUMENTS

| | | | |
|---|---|---|---|
| 5,553,864 A * | 9/1996 | Sitrick | 463/31 |
| 5,720,619 A * | 2/1998 | Fisslinger | 434/336 |
| 6,179,746 B1 * | 1/2001 | Delman | 482/6 |
| 6,190,314 B1 * | 2/2001 | Ark et al. | 600/300 |
| 6,545,682 B1 * | 4/2003 | Ventrella et al. | 345/473 |
| 7,764,026 B2 * | 7/2010 | Dowling et al. | 315/307 |
| 8,308,562 B2 * | 11/2012 | Patton | 463/36 |
| 8,348,760 B2 * | 1/2013 | Mao et al. | 463/37 |
| 8,384,565 B2 * | 2/2013 | Urata et al. | 341/20 |
| 8,454,437 B2 * | 6/2013 | Dugan et al. | 463/31 |
| 2002/0143241 A1 * | 10/2002 | Thorell | 600/300 |
| 2003/0195040 A1 | 10/2003 | Breving | 463/37 |
| 2004/0152512 A1 * | 8/2004 | Collodi et al. | 463/30 |
| 2007/0149282 A1 * | 6/2007 | Lu et al. | 463/36 |
| 2009/0113295 A1 * | 4/2009 | Halpern et al. | 715/273 |
| 2010/0261526 A1 * | 10/2010 | Anderson et al. | 463/31 |
| 2010/0304864 A1 * | 12/2010 | Johnson et al. | 463/36 |
| 2011/0201414 A1 * | 8/2011 | Barclay et al. | 463/25 |

\* cited by examiner

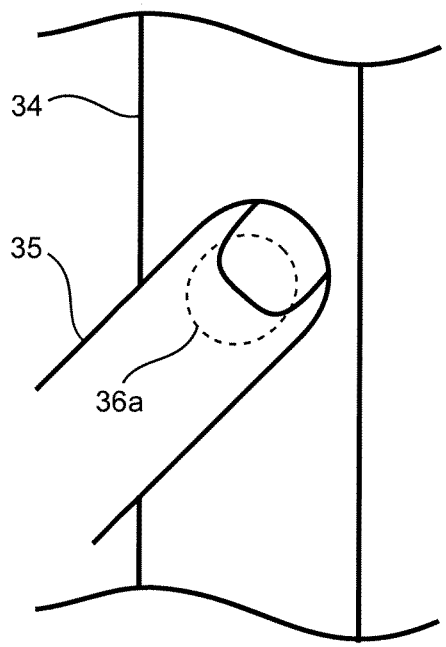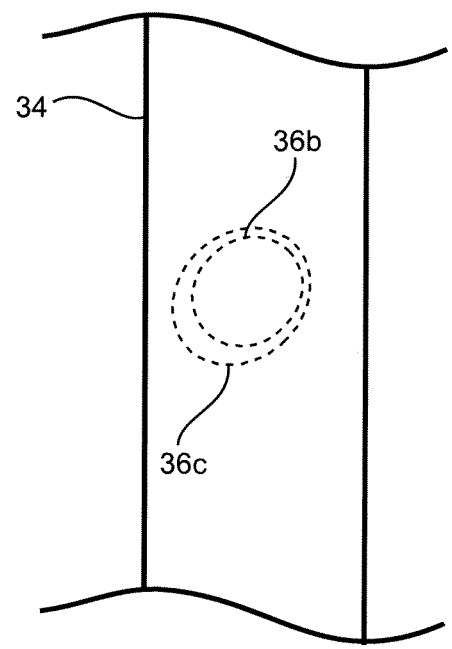
FIG. 1F        FIG. 1G
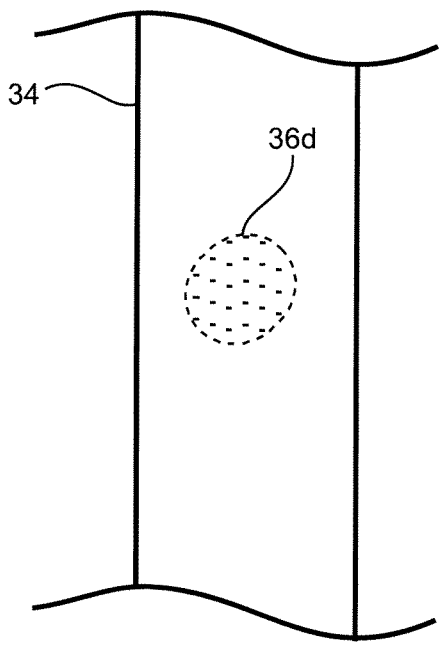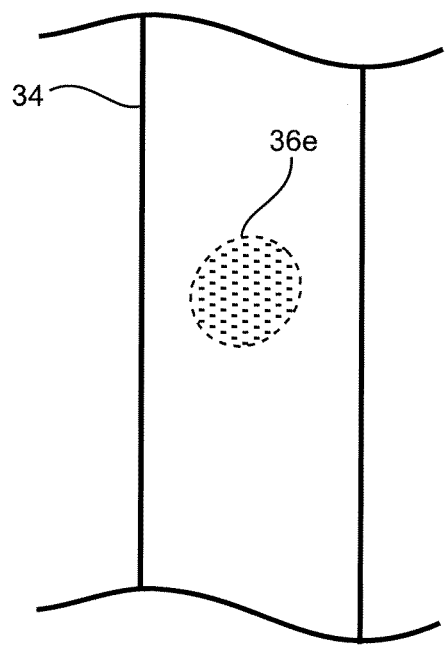
FIG. 1H        FIG. 1I

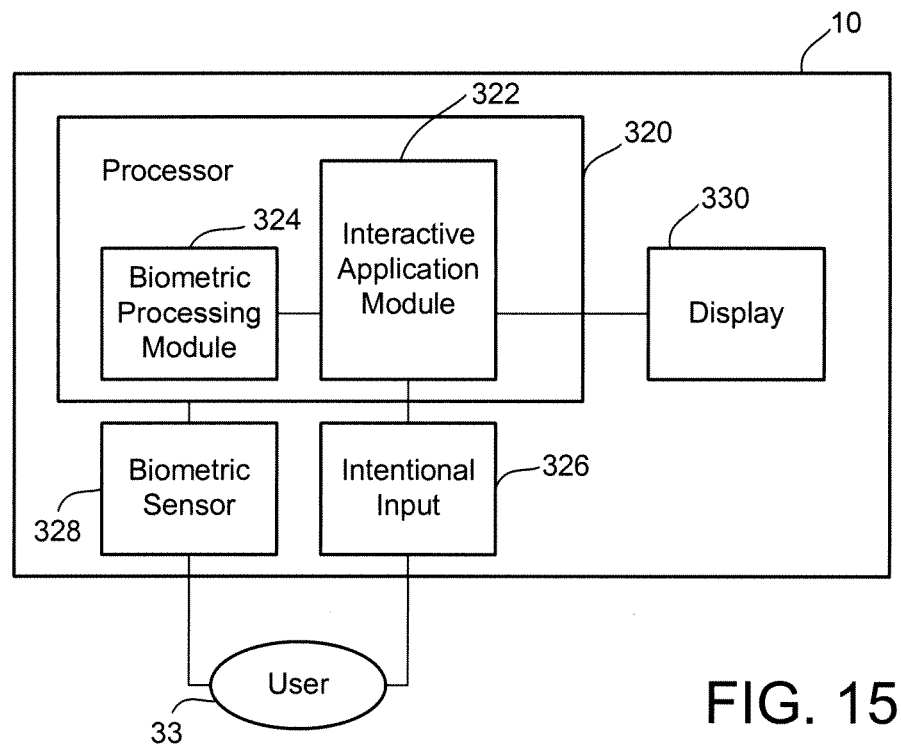
FIG. 15
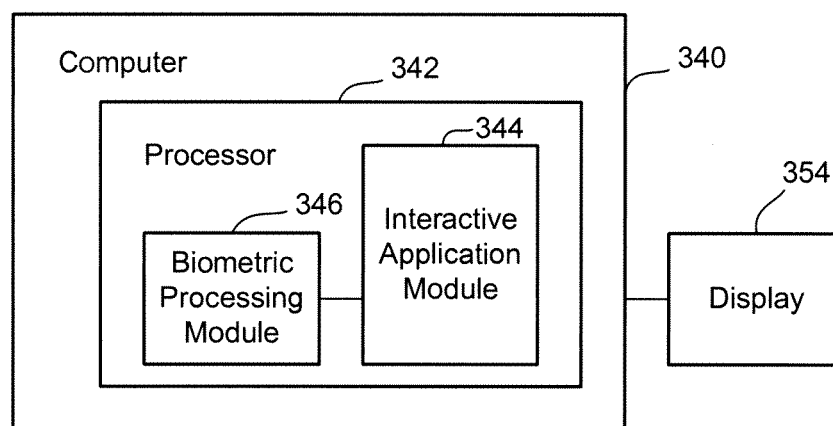
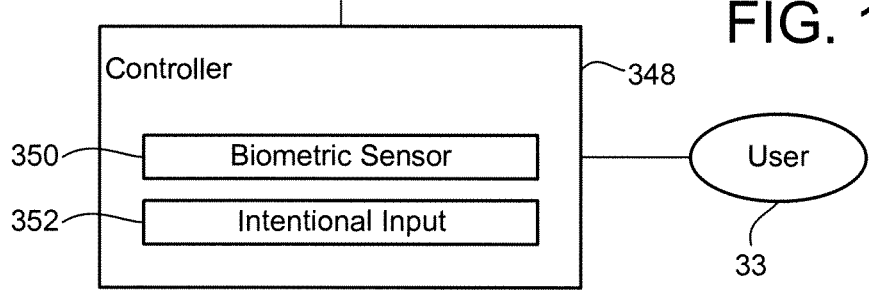
FIG. 16

BIOMETRIC INTERFACE FOR A HANDHELD DEVICE

CLAIM OF PRIORITY

This application claims priority from U.S. Provisional Patent Application No. 61/326,747 filed on Apr. 22, 2010 and entitled "BIOMETRIC INTERFACE FOR A HANDHELD DEVICE," which is incorporated herein by reference in its entirety for all purposes.

BACKGROUND

1. Field of the Invention

The present invention relates to methods and systems for enabling an augmented reality character to maintain and exhibit awareness of an observer.

2. Description of the Related Art

A growing segment of the video game industry involves the use of portable hand-held devices. Examples of such portable devices include dedicated gaming devices, such as those manufactured by Sony Computer Entertainment Inc. and others, as well as other types of portable devices such as smartphones, PDA's, digital multimedia players, etc. As the computing power of such portable devices has increased, so has the ability of the portable devices to handle increasingly complex programs and tasks.

For example, today's portable devices may include several different types of hardware integrated into a single device. Many such devices may include a color display, a camera, speakers, and an input mechanism such as buttons, a touchscreen or a stylus.

It is in this context that embodiments of the invention arise.

SUMMARY

Embodiments of the present invention provide methods and systems for applying biometric data to an interactive program displayed on a handheld device. It should be appreciated that the present invention can be implemented in numerous ways, such as a process, an apparatus, a system, a device or a method on a computer readable medium. Several inventive embodiments of the present invention are described below.

In one embodiment, a method for processing biometric data to affect interactivity during execution of an interactive program is provided. According to the method, an interactive program is displayed on a handheld device. The handheld device includes one or more selectable inputs, each of the selectable inputs being for a specific action to be executed by the interactive program. The presence of human skin is detected by a first sensor and a second sensor of the handheld device. According to the method, biometric data obtained from the human skin of the user using the first and second sensors is read. Then, biometric data is processed to determine a bio-input characteristic. The bio-input characteristic is analyzed during execution of the interactive program. And a state of the interactive program is modified using the bio-input characteristic.

In one embodiment the reading of the biometric data includes method operations of receiving raw signal data from the first and second sensors, filtering the raw signal data to determine bio-signal data, and analyzing the bio-signal data to determine the biometric data.

In one embodiment, the bio-signal data may include galvanic skin response signal data, electromuscular signal data, and/or electrocardio signal data.

In one embodiment, the method operations of reading the biometric data, processing the biometric data to determine a bio-input characteristic, and analyzing the bio-input characteristic are continuously repeated. Furthermore, the bio-input characteristic may change continuously over time, during execution of the interactive program.

In one embodiment, the analyzing of the bio-input characteristic includes method operations of determining a relationship between the bio-input characteristic and one or more settings governing the state of the interactive program, and adjusting the settings according to the relationship so as to cause the modification of the state of the interactive program.

In one embodiment, the settings may include one or more or a combination of: audio attributes, including volume, visual attributes, including brightness, zoom, steadiness, and color, an attribute of a character in the interactive program, including appearance, color, countenance, and respiration intensity and rate, an attribute of an action performed by a character in the interactive program, including force of an attack action, accuracy of an attack action, and speed of movement, a level of difficulty.

In one embodiment, the selectable inputs define mechanisms for receiving intentional input from the user, wherein the selectable inputs may consist of button input, touchscreen input, gesture input, and/or motion input.

In one embodiment, the modification of the state of the interactive program includes method operations of determining a current stage of the interactive program, and associating a modification parameter with the current stage, wherein the modification parameter determines the applicability of the bio-input characteristic to a current state of the interactive program.

In one embodiment, the modification parameter determines when the bio-input characteristic is applied to modify the state of the interactive program.

In one embodiment, the analysis of the bio-input characteristic includes predicting a future value of the bio-input characteristic, wherein modifying the state of the interactive program includes modification based on the predicted future value of the bio-input characteristic.

In one embodiment, a method for affecting interactivity between a user and an interactive application is provided. According the method, interactivity between a user and an interactive application displayed on a handheld device is initiated. One or more physiological attributes of the user are monitored during the interactivity. And a state of the interactive application is adjusted based on the monitored physiological attribute of the user.

In one embodiment, the monitoring of the physiological attribute includes method operations of detecting data which describes the physiological attribute from one or more sensors coupled to the handheld device, and processing the detected data to determine a value of the physiological attribute.

In one embodiment, monitoring the physiological attribute further includes method operation of recording the value of the physiological attribute, and tracking changes in the value of the physiological attribute.

In one embodiment, the adjusting of the state of the interactive application includes method operations of determining a relationship between the value of the physiological attribute and the state of the interactive program, and adjusting the state of the interactive application according to the value of the physiological attribute based on the relationship between the value of the physiological attribute and the state of the interactive program.

In one embodiment, the adjustment of the state of the interactive application further includes method operations of determining a stage of the interactivity between the user and the interactive application, and adjusting the state of the interactive application based on the stage of the interactivity between the user and the interactive application.

In one embodiment, the adjustment of the state of the interactive application provokes a predetermined change in the physiological attribute of the user.

In one embodiment, the adjustment of the state of the interactive application includes method operations of predicting a future value of the physiological attribute, and adjusting the state of the interactive application based on the predicted future value of the physiological attribute.

In one embodiment, a handheld device for applying biometric input to an interactive application module is provided. The handheld device includes a processor, at least one input mechanism for receiving intentional input from a user, and at least one biometric sensor for detecting biometric data of the user. The handheld device further includes a biometric processing module executed by the processor, the biometric processing module receiving the biometric data from the biometric sensor and processing the biometric data to determine a bio-input characteristic. The handheld device further includes an interactive application module executed by the processor, the interactive application module receiving the bio-input characteristic and adjusting a state of the interactive application module based on the bio-input characteristic. The handheld device also includes a display for displaying the interactive program module to a user.

In one embodiment, the interactive application module determines a relationship between the bio-input characteristic and the state of the interactive application module, and adjusts the state of the interactive application module according to the relationship between the bio-input characteristic and the state of the interactive application module.

In one embodiment, the input mechanism may be one or more of a button, joystick, directional pad, touch-sensitive device, trackball, or motion-sensing device.

In one embodiment, the bio-input characteristic defines a current value of a physiological attribute of the user.

In one embodiment, the bio-input characteristic defines a predicted future value of a physiological attribute of the user.

In another embodiment, a system for applying biometric input to an interactive application module is provided. The system includes a computer configured to execute an interactive application module, and a controller configured to communicate with the computer. The controller includes at least one input mechanism for receiving intentional input from a user, and at least one biometric sensor for detecting biometric data of the user. The computer further includes a biometric processing module, the biometric processing module receiving the biometric data from the biometric sensor and processing the biometric data to determine a bio-input characteristic. The interactive application module receives the bio-input characteristic and adjusts a state of the interactive application module based on the bio-input characteristic. A display is connected to the computer for displaying the interactive application module to a user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 1F, 1G, 1H, and 1I illustrate various representations of a contact area between a user and an electrode, in accordance with embodiments of the invention.

FIG. 15 illustrates a handheld device for applying biometric input to an interactive application module, in accordance with an embodiment of the invention.

FIG. 16 illustrates a system for applying biometric input to an interactive application module, in accordance with an embodiment of the invention.

DETAILED DESCRIPTION

The following embodiments describe methods and apparatus for a system that enables biometric data to be detected from a user and applied to an interactive program rendered on a handheld device. Examples of biometric data which can be detected include galvanic skin resistance (GSR), electro-cardio data (as illustrated in an electrocardiogram (ECG/EKG)), and electro-muscular data (as illustrated in an electromygram (EMG)). According to embodiments of the invention, a handheld device may be provided with dry electrodes for contacting the skin of a user, and detecting bio-signal data of the user. The bio-signal data is processed and analyzed to determine various biometric data, such as GSR, EMG, and ECG values, heart rate, respiration, tonic and phasic changes, etc. The biometric data is applied to an interactive program so as to affect a state of the interactive program. The resulting new state of the interactive program is then rendered on a display of the handheld device to the user. Accordingly, methods and apparatus in accordance with embodiments of the invention will now be described.

It will be obvious, however, to one skilled in the art, that the present invention may be practiced without some or all of these specific details. In other instances, well known process operations have not been described in detail in order not to unnecessarily obscure the present invention.

Figure 1A:
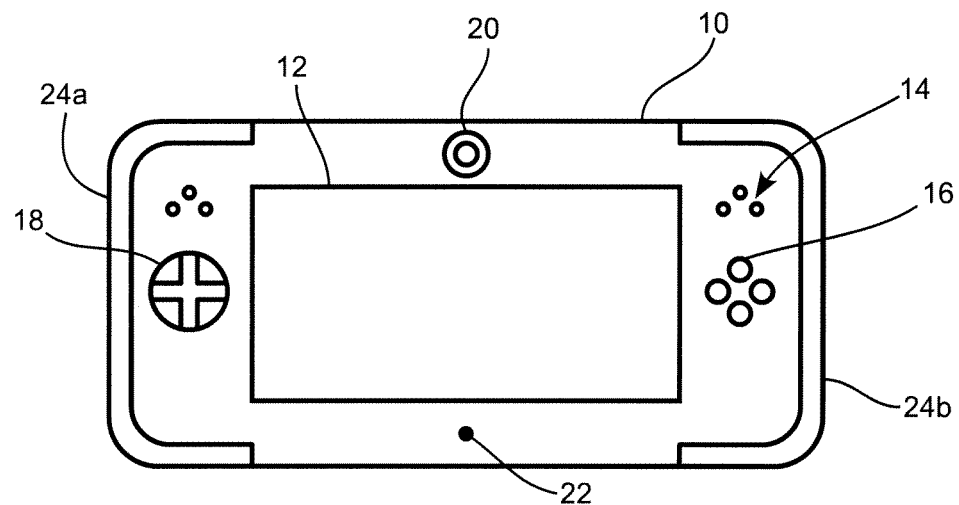
FIG. 1A illustrates a front view of an exemplary portable handheld device, in accordance with an embodiment of the invention.

With reference to FIG. 1A, a front view of an exemplary portable handheld device 10 is shown, in accordance with an embodiment of the invention. The handheld device 10 includes a display 12 for displaying graphics. In embodiments of the invention, the display 12 is utilized to show an interactive program or application in real-time. In various embodiments of the invention, the display 12 may incorporate any of various display technologies, such as touch-sensitivity. The handheld device 10 includes speakers 14 for facilitating audio output. The audio output from speakers 14 may include any sounds relating to the interactive program, such as sounds of a character, background sounds, soundtrack audio, sounds from a remote user, or any other type of sound.

The handheld device 10 includes buttons 16 and directional pad 18, which function as input mechanisms for receiving input from a user of the portable device. In embodiments of the invention, it is contemplated that any of various other types of input mechanisms may be included in the handheld device 10. Other examples of input mechanisms may include a stylus, touch-screen, keyboard, keypad, touchpad, trackball, joystick, trigger, or any other type of input mechanism which may be useful for receiving user input.

A front-facing camera 20 is provided for capturing images and video of a user of the portable handheld device 10, or of other objects or scenery which are in front of the portable device 10. Additionally, a microphone 22 is included for capturing audio from the surrounding area, such as sounds or speech made by a user of the portable device 10.

A left electrode 24a and a right electrode 24b are provided for detecting biometric data from the left and right hands of a user holding the handheld device. As shown at FIG. 1A, the left electrode 24a and right electrode 24b each may be configured so as to span the side of the handheld device 10. This provides relatively large surfaces upon which the skin of the user's hand may touch the electrodes. The left and right electrodes 24a and 24b contact the left and right hands, respectively, of the user when the user holds the handheld device 10. In various other embodiments, of the invention, electrodes included in a handheld device for detecting biometric data from a user may have any of various other configurations.

Figure 1B:
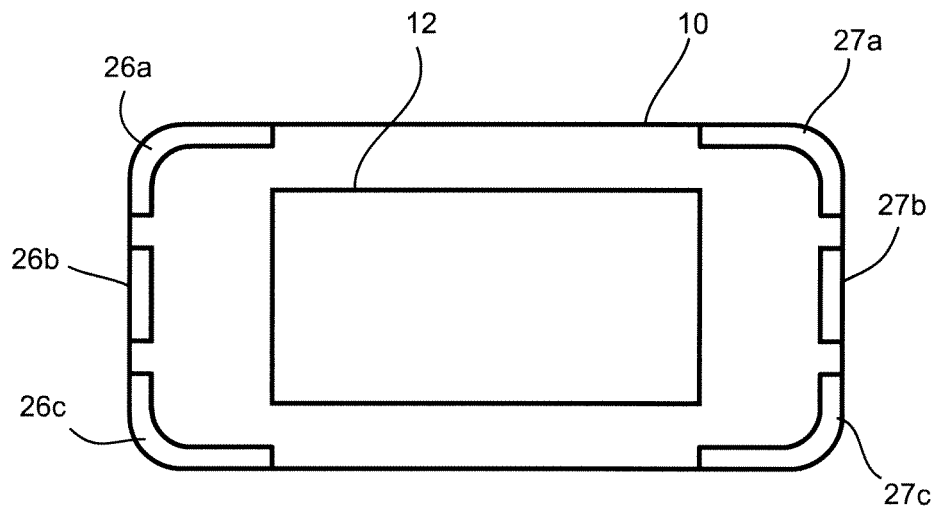
FIG. 1B illustrates a front view of an exemplary portable handheld device, in accordance with an embodiment of the invention.

For example, in one embodiment shown at FIG. 1B, the handheld device 10 includes multiple electrode surfaces on each side. As shown, on the left side of the handheld device 10, there are electrode surfaces 26a, 26b, and 26c, and on the right side of the handheld device there are electrode surfaces 27a, 27b, and 27c. In one embodiment, each of the electrode surfaces on a side of the handheld device 10 constitutes a distinct electrode. Thus, the illustrated embodiment includes six distinct electrodes, 26a, 26b, 26c, 27a, 27b, and 27c.

By providing multiple electrodes on each side of the handheld device 10 it is possible to utilize the multiple electrodes for various purposes. In various embodiments, the multiple electrodes could be configured to detect different types of biometric data. For example, in one embodiment, electrodes 26a and 27a could be configured to detect GSR data; electrodes 26b and 27b could be configured to detect electro-cardio data; and electrodes 26c and 27c could be configured to detect electro-muscular data. In other embodiments, the various electrodes could have other specific configurations wherein different types of biometric data are detected by the different electrodes.

Furthermore, utilizing multiple electrodes can facilitate determination of the location of a user's hand or finger that is touching one or more of the multiple electrodes. For example, constant contact which is detected at electrodes 26b and 26c on the left side of the handheld device 10, as well as electrodes 27b and 27c on the right side of the handheld device 10, with simultaneous intermittent contact at electrodes 27a and 27b, might indicate that the user is holding the handheld device with the palm of her left hand contacting electrodes 26b and 26c, and with the palm of her right hand contacting electrodes 27b and 27c. And the intermittent contact with electrodes 26a and 27a could be indicative of the user applying her fingers to the electrodes 26a and 27a in an intermittent fashion while holding the handheld device as such. Thus, the electrodes contacted by the user's palms could be used to detect and monitor biometric data in a continuous fashion, while the electrodes contacted in an intermittent fashion would detect biometric data in an intermittent manner. For example, the intermittently detected biometric data might be utilized in a similar manner to traditional buttons (e.g. indicating selection in an on or off fashion), but with the additional capability of detecting biometric data at the same time. Various other scenarios can be imagined wherein the multiple electrode surfaces are configured so as to enable detection of the user's hand when placed on one or more of the electrode surfaces.

Additionally, the use of multiple electrodes can be used to sense gestures of a user. For example, by detecting sequential contacts with the electrodes along one of the sides of the handheld device, it may be determined that the user has run her finger along the side of the handheld device. The direction can also be determined based on the order in which the electrodes are contacted by the user's hand. And the timing of the contacts made with the electrodes can be used to determine the speed with which the user ran her finger across the electrodes. These and other types of gestures can be detected on a handheld device equipped with multiple electrodes as provided in the embodiments described herein.

In an alternative embodiment, the three electrode surfaces on one side of the handheld device 10 may function as part of the same electrode for purposes of detecting biometric data, but may also be provided with sensors (not shown) which enable the device to distinguish which of the electrode surfaces is being touched. Thus, according to such an embodiment, the electrode surfaces 26a, 26b and 26c may be connected to each other so as to function as part of the same electrode, whereas the electrode surfaces 27a, 27b, and 27c may be connected to each other so as to function as part of a second electrode. However, sensors may be included to distinguish which of the surfaces 26a, 26b, 26c, 27a, 27b, and 27c, is being contacted at any given time.

Figure 1C:
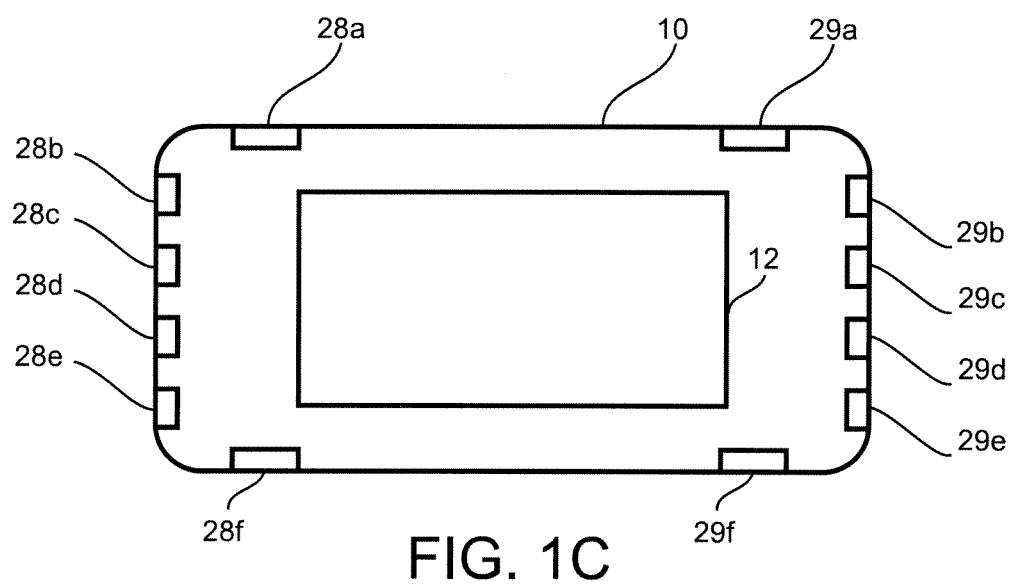
FIG. 1C illustrates a front view of an exemplary portable handheld device, in accordance with an embodiment of the invention.

Though the foregoing embodiments have been described with reference to a handheld device having three electrode surfaces on each side, in other embodiments of the invention, the handheld device may have any number of electrodes, arranged at any location on the handheld device. For example, with reference to FIG. 1C, a handheld device 10 is shown having electrode surfaces 28a, 28b, 28c, 28d, 28e, and 28f on the left side, and electrode surfaces 29a, 29b, 29c, 29d, 29e, and 29f on the rights side. By providing a higher number of distinct electrode surfaces on the device, it is possible to determine with greater precision the locations of contact with the device by the user's hands. While the embodiments described herein generally relate to handheld devices with electrodes located on the sides of the device, in other embodiments, the electrodes may be placed at various other locations on the device, such as on the top, lower, front, and back sides of the handheld device.

Figure 1D:
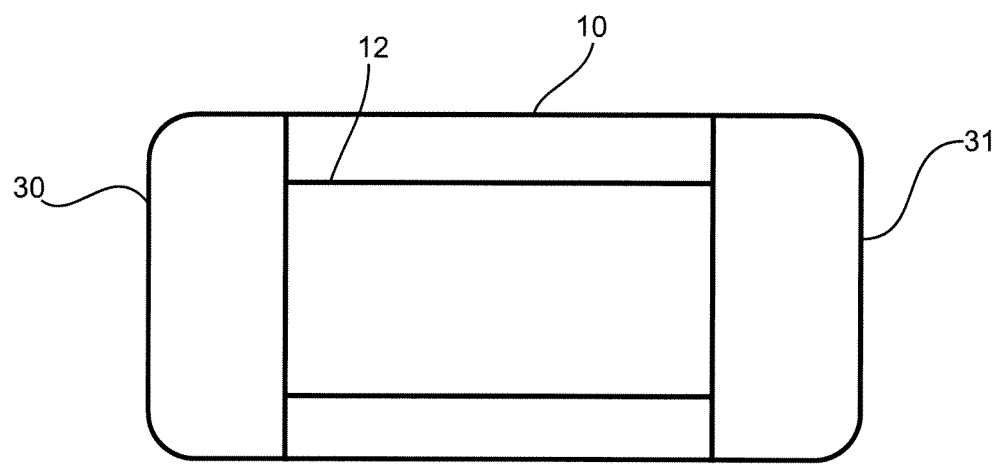
FIG. 1D illustrates a front view of an exemplary portable handheld device, in accordance with an embodiment of the invention.

With reference to FIG. 1D, a handheld device 10 is shown in accordance with one embodiment of the invention. The handheld device 10 includes two electrodes 30 and 31, located on opposite sides of the handheld device 10. The electrodes 30 and 31 as shown occupy a relatively large surface area on the handheld device 10. By increasing the available surface area of the electrodes, it is possible to attain a greater skin contact area with the electrodes when the user holds the handheld device 10. A greater skin contact area can aid in the detection of biometric data through the electrodes, as the greater contact area provides for a higher initial bio-electric signal detected by the electrodes.

Figure 1E:
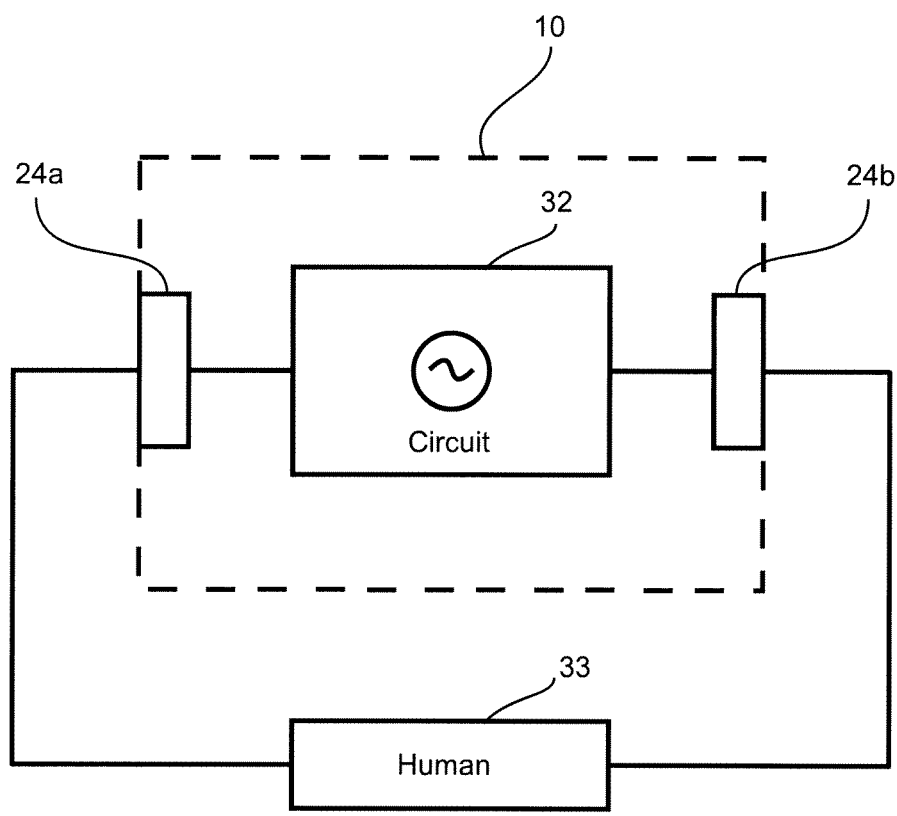
FIG. 1E illustrates a schematic diagram illustrating the circuit which is formed by a user contacting a handheld device that detects bio-electric signals of the user, in accordance with an embodiment of the invention.

With reference to FIG. 1E, a schematic diagram illustrating the circuit which is formed by a user contacting a handheld device that detects bio-electric signals of the user, in accordance with an embodiment of the invention. As shown, the handheld device 10 includes circuitry 32 for detecting bio-electric signals of the user. This circuitry is connected to electrodes 24a and 24b, which may or may not have a potential applied. The user 33 contacts each of the electrodes 24a and 24b, thus completing the circuit, so as to enable detection of the user's bio-electric signal data.

With reference to FIGS. 1F, 1G, 1H, and 1I, various representations of a contact area between a user and an electrode are shown, in accordance with embodiments of the invention. At FIG. 1F, a user's finger 35 is shown contacting an electrode 34. The contact area 36a is that region where the user's finger 35 is actually in contact with the electrodes 34. As shown at FIG. 1G, the contact area may vary depending on the pressure applied by the user's finger 35. For example, at a given applied pressure, the area of contact may be an area shown by contact area 36b. Whereas, when the applied pressure increased, the area of contact may increase in size, as shown by contact area 36c. A greater contact area provides for higher signal transmission, thus increasing the amplitude of detected bio-electric signals.

Additionally, the level of sweat on a person's skin can affect the level of resistance at the area of contact. In general, higher levels of sweat produce lower resistance, resulting in more efficient transmission of bio-electric signal data. An increase in sweat production may result from an increase in the user's stress level, thus resulting in higher amplitude bio-electric signals as detected by electrodes of the handheld device. As shown at FIG. 1H, the contact area 36d has a given level of sweat (represented by the shading of the contact area 36d). Whereas at FIG. 1I, the contact area 36e has a higher level of sweat (represented by the darker shading of the contact area 36e). The contact area 36e produces lower resistance to current, thereby facilitating more efficient transfer of higher amplitude bio-electric signal data.

Figure 1J:
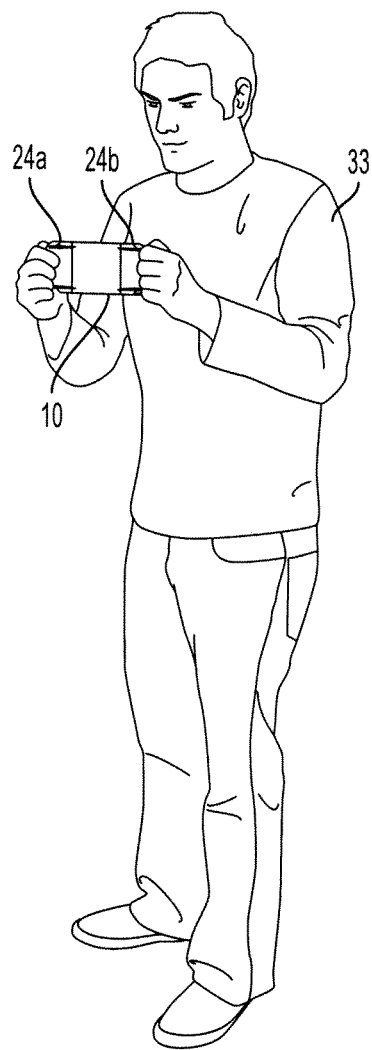
FIG. 1J illustrates a user holding a portable handheld device, in accordance with an embodiment of the invention.

With reference to FIG. 1J, a user 33 is shown holding a portable handheld device 10, in accordance with an embodiment of the invention. The handheld device 10 includes electrodes 24a and 24b for detecting bio-electric signal data from the user 33. The electrodes 24a and 24b are contacted by the user's hands, so that the user 33 completes the circuit formed by the handheld device 10 and its electrodes.

Figure 1K:
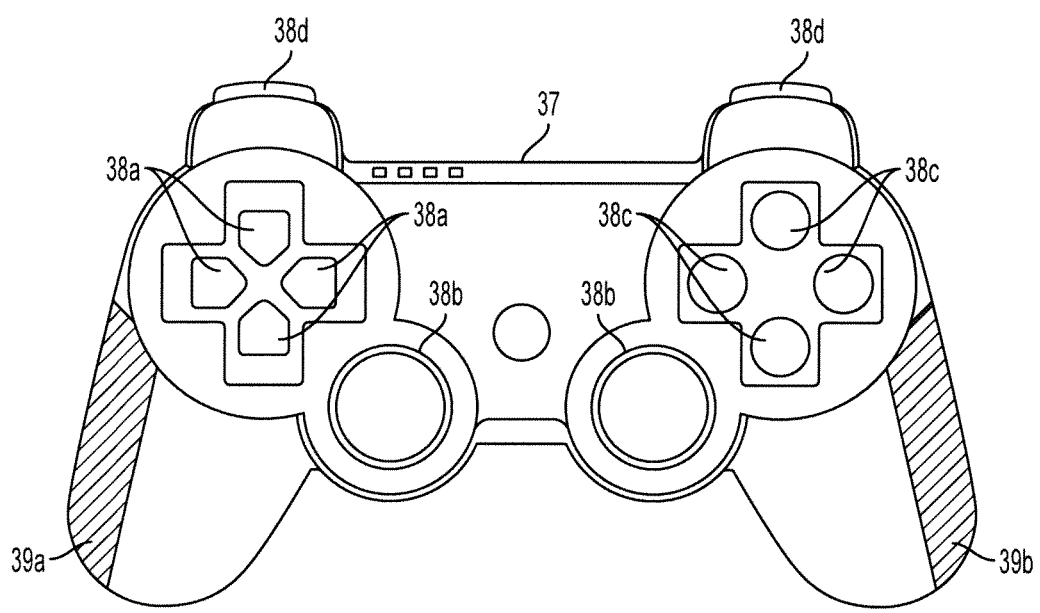
FIG. 1K illustrates a controller for interfacing with an interactive program, in accordance with an embodiment of the invention.

With reference to FIG. 1K, a controller for interfacing with an interactive program is shown, in accordance with an embodiment of the invention. The controller 37 is of a type utilized to interface with a computer such as a personal computer, gaming console, or other type of computing device which executes an interactive program. The controller 37 may communicate with the computer via a wired or wireless connection. In other embodiments, the interactive program may be executed by a computing device which is accessible via a network, such as a LAN, WAN, the Internet, and other types of networks. In such embodiments, input detected by the controller is communicated over the network to the interactive application. The input from the controller may first be received by a local device which may process the input and transmit data containing the input or based on the input to the networked device executing the interactive application. A user provides input to the interactive program via the controller 37, utilizing hardware of the controller 37, such as directional pad 38a, joysticks 38b, buttons 38c, and triggers 38d. The controller 37 also includes electrodes 39a and 39b for detecting bio-electric signals from the user. As described in further detail below, the bio-electric signals may be processed to determine biometric data that is used as an input for the interactive program.

Figure 1L:
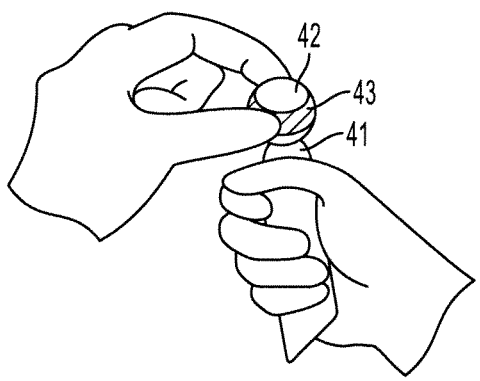
FIGS. 1L, 1M, and 1N illustrate a controller for interfacing with an interactive application, in accordance with embodiments of the invention.
Figure 1M:
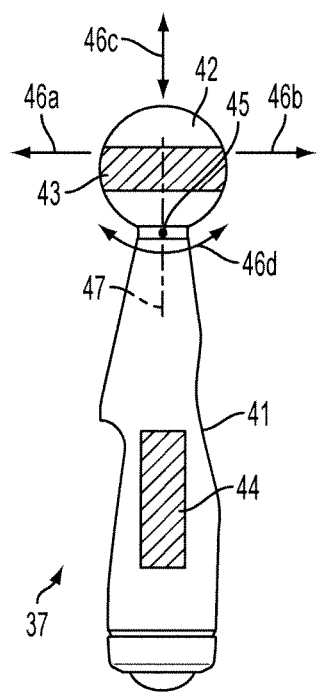
Figure 1N:
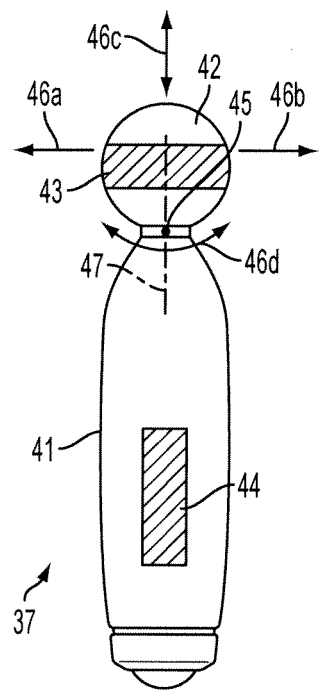

With reference to FIGS. 1L, 1M, and 1N, a controller for interfacing with an interactive application is shown, in accordance with embodiments of the invention. The controller 37 connects to a computer executing an interactive application, so as to provide input to the interactive application. The controller 37 includes a handle 41 and an attachment 42. The attachment 42 may be geometrically shaped, patterned or lighted or otherwise visually distinct so as to be trackable when captured by a video camera. In one embodiment, the attachment 42 may be spherical. By tracking the location and orientation of the attachment 42 it is possible to determine the position and movements of the controller 37, thus providing for motion input to the interactive application.

Additionally, the controller 37 includes electrodes 43 and 44 on the attachment 42 and handle 41, respectively. The electrodes 43 and 44 are utilized to detect bio-electric signal data from the user. As shown, the electrode 43 is formed as a ring around the attachment 42. However, in other embodiments, the electrode 43 may have any shape or coverage of the attachment, including covering the entire surface of the attachment 42 or having multiple separate surfaces on the attachment 42. Likewise, the electrode 44 as shown on the handle 41 may have any shape or coverage on the handle 41. In one embodiment, the electrode 44 has two surfaces on opposing sides of the handle 41. In other embodiments, there may be one or more surfaces of electrode 44 located anywhere on the surface of the handle 41. In other embodiments, there may be multiple electrodes on each of the attachment 42 or the handle 41.

The attachment 42 may also be configured to detect force applied by the user in various directions to the attachment 42. For example, the controller 37 may detect force applied in a lateral direction to the attachment, such as in directions 46*a* or 46*b*. The controller 37 may also detect compressive/tensile forces applied to the attachment 42 along directions 46*c*, or rotational forces (torque) applied to the attachment 42 relative to the handle 41 in directions 46*d* about axis 47.

Embodiments of the invention contemplate the use of bio-electric signal data to affect a user's interactivity with an interactive program. As discussed above, embodiments include handheld devices equipped with dry electrodes for the detection of bio-electric signals. In general, detection of bio-electric signal data entails the acquisition of a raw signal which is amplified, filtered for the bio-electric signal of interest, and converted to digital bio-signal data. The digital bio-signal data is then processed to extract desired elements or recognize patterns within the bio-signal. The results of this signal processing are then used to affect interactivity with an interactive program. Examples of bio-electric signals include galvanic skin response (GSR), electro-muscular signals, and electro-cardio signals.

Galvanic skin response (GSR) is a measurement of the electrical resistance of the skin. GSR is measured by applying a current across the skin and measuring the resistance/impedance. In embodiments as discussed above, a signal/current may be applied across left and right electrodes of a handheld device which are in contact with the hands of a user, so as to facilitate detection of the user's GSR. In various embodiments, the applied signal could be a signal that is unlikely to be anything other than GSR (e.g. a square wave), so as to facilitate ease of detection of the true GSR. GSR is roughly correlated with user emotional reactions to external stimulation, and can indicate a measurement of nervousness or mental stress. By looking for patterns within the GSR signal, it can be possible to determine if a user is relaxed, stressed, challenged or bored, startled, sleepy, lying or telling the truth. Long term changes in GSR can indicate a user's overall level of relaxation. Whereas short-term changes in GSR can provide an instant gauge of a user's surprise.

Figure 2:
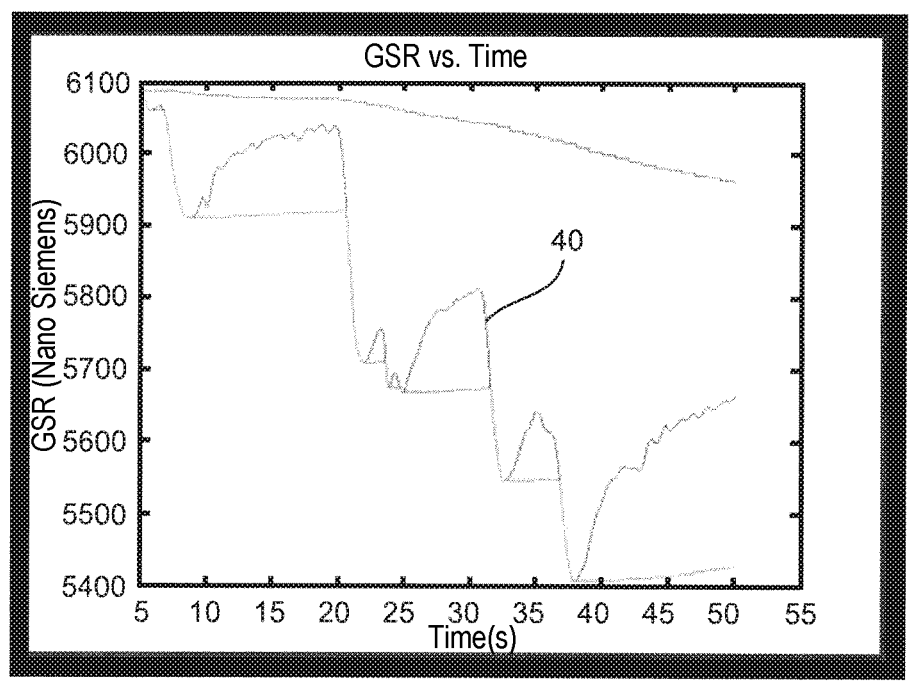
FIG. 2 illustrates a graph illustrating GSR over time, in accordance with an embodiment of the invention.

With reference to FIG. 2, a graph illustrating GSR over time is shown, in accordance with an embodiment of the invention. The curve 40 illustrates a user's GSR over time. Fluctuations in the GSR signal may correspond to the user's breathing or other types of activities and corresponding reactions in GSR.

Electro-muscular signals are bio-electric signals generated by muscle cell activity. A graph of electro-muscular signal is an electromyogram (EMG). For convenience throughout this disclosure, the electro-muscular signal shall be referred to as the EMG signal. In embodiments of the invention as discussed above, the EMG signal may be detected through electrodes included in a handheld device. The EMG signal can enable determination of muscle tension in the hands and arms of a user holding the handheld device with their hands so as to contact the electrodes. As the EMG signal enables detection of muscle tension, this can be used to determine squeeze pressure for the left and right hands of the user.

Figure 3:
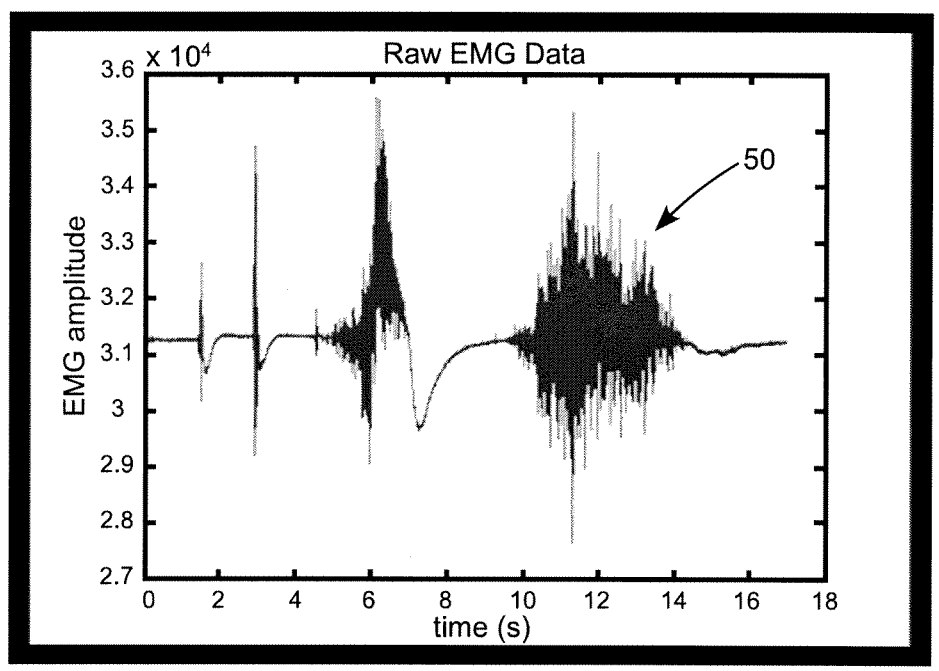
FIG. 3 illustrates an electromyogram illustrating electromuscular activity over time, in accordance with an embodiment of the invention.

With reference to FIG. 3, an EMG illustrating electro-muscular activity over time is shown, in accordance with an embodiment of the invention. The curve 50 illustrates a user's EMG signal over time. Fluctuations in the EMG signal correspond to changes in the muscle tension of the user.

Electro-cardio signal data is generated by the electrical activity of the heart as it progresses through the various stages of contraction. A graph of the electro-cardio signal is an electrocardiogram (EKG or ECG). For convenience throughout this disclosure, the electro-cardio signal shall be referred to as the EKG signal. In embodiments of the invention as discussed above, the EKG signal may be detected through electrodes included in a handheld device. By analyzing the frequency of the user's heart beat, it is possible to determine the user's heart rate. Additionally, by analyzing fluctuations in the amplitude of the EKG signal, it is possible to determine the user's respiration—i.e. when the user is inhaling or exhaling, or holding their breath. Thus, by analyzing a user's EKG signal, it can be possible to determine when the user is relaxed or nervous, challenged or bored, active or inactive, sleepy, physically rested, or out of breath.

Figure 4:
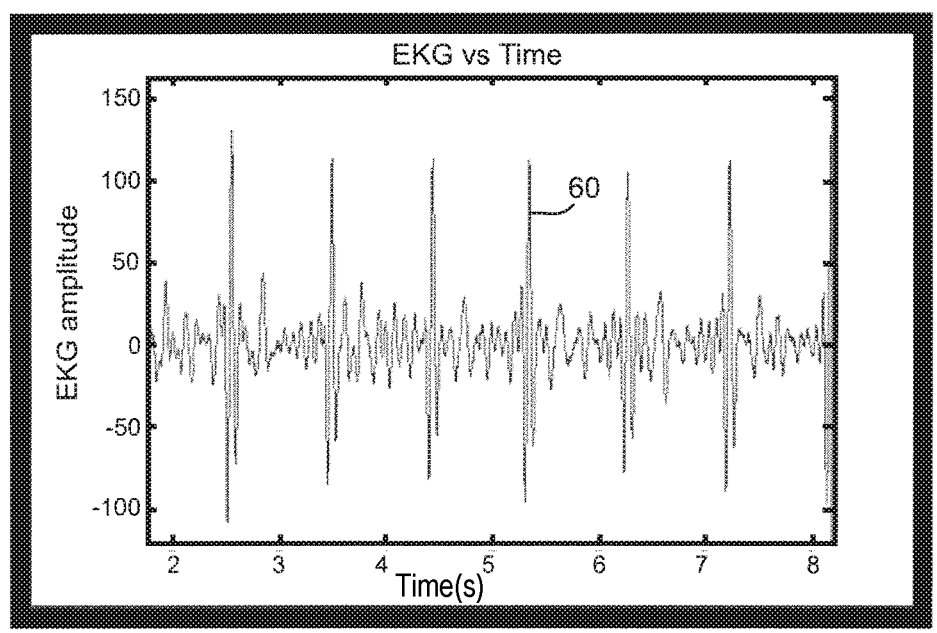
FIG. 4 illustrates an electrocardiogram illustrating electro-cardio activity over time, in accordance with an embodiment of the invention.

With reference to FIG. 4, an EKG illustrating electro-cardio activity over time is shown, in accordance with an embodiment of the invention. The curve 60 illustrates a user's EKG signal over time. Repetitive fluctuations in the EKG signal indicate the user's heart rate, whereas repetitive amplitude fluctuations indicate the user's respiration.

In embodiments of the invention, the aforementioned GSR, EMG and EKG signals are utilized to affect interactivity with an interactive program. In various embodiments, one or more of the aforementioned bio-signals may be used as an input in order to affect a state of an interactive program.

Figure 5:
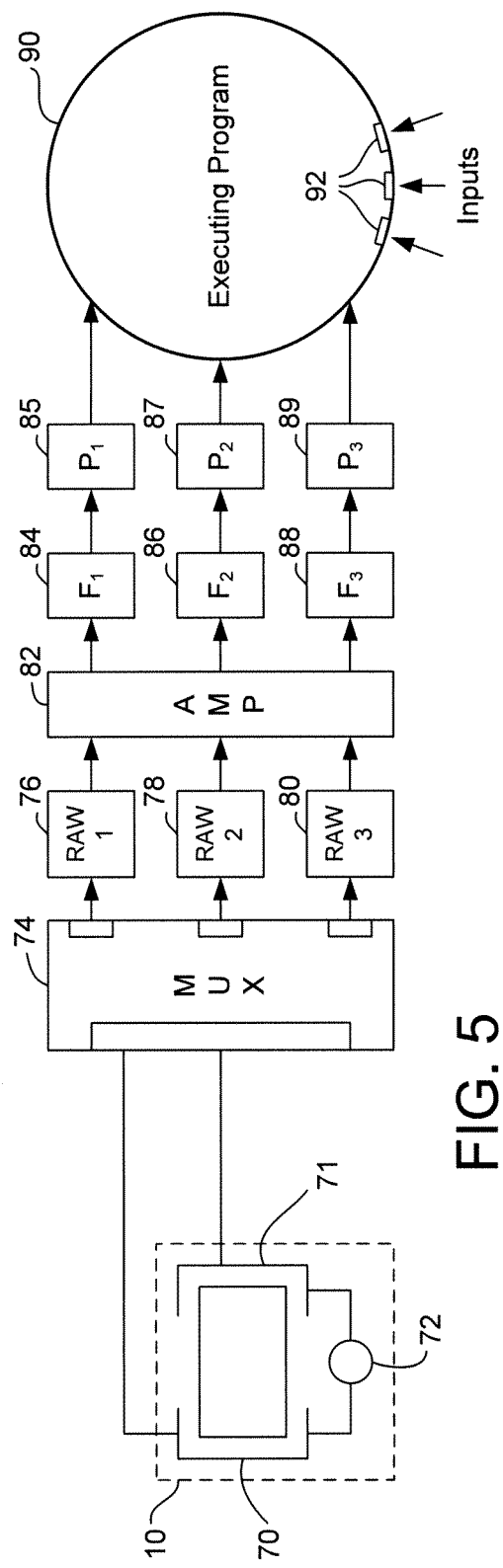
FIG. 5 illustrates a process for using bio-signals to affect an interactive program, in accordance with an embodiment of the invention.

With reference to FIG. 5, a diagram illustrating a process for using bio-signals to affect an interactive program is shown, in accordance with an embodiment of the invention. The handheld device 10 includes electrodes 70 and 71, as well as power source 72. The power source 72 applies a current to the electrodes 70 and 71. The electrodes 71 and 72 receive bio-electric signals from a user holding the handheld device. These bio-electric signals are passed through a multiplexer 74, which differentiates the signals to yield individual raw bio-signal data, shown by the reference numbers 76, 78, and 80. In one embodiment, the various types of raw-biosignal data include GSR data, EMG data, and ECG data.

Each of the raw bio-signals 76, 78, and 80, is amplified by amplifier 82, and filtered and processed by corresponding filters and processing modules. As shown, the amplified raw bio-signal 76 is filtered by filter 84 and processed by processing module 85; amplified raw bio-signal 78 is filtered by filter 86 and processed by processing module 87; and amplified raw bio-signal 78 is filtered by filter 88 and processed by processing module 89. Each of the filters 84, 86 and 88 filters its respective raw bio-signal so as to generate a refined or pure bio-signal, such as a GSR signal, an EMG signal, or an ECG signal. Each of the processing modules 85, 87, and 89, then processes the refined bio-signal to extract biometric data that may be supplied as input to the interactive program 90.

In various embodiments of the invention, the processing modules may be configured to generate any of various kinds of biometric data for use by the interactive program. Examples of biometric data may include fairly basic types of information such as current values of the various bio-signals and changes in the values of a bio-signal. Or the processing modules may be configured to analyze the bio-signals to determine more complex types of biometric data, such as repetitive patterns, rates, short-term changes, long-term changes, predictive analysis results, etc. Examples of types of biometric data that may be determined by the processing modules include instantaneous values of GSR, EMG, and ECG signals, changes in such values, amplitude fluctuations, muscle tension, heart rate, respiration, etc.

The biometric data determined by processing the bio-signals is provided as input to an executing interactive program 90. The interactive program 90 may also be configured to receive other types of inputs 92, such as input from various interfaces, such as buttons, a touchscreen, motion sensors, a microphone, etc. The biometric data is used to affect a state of the interactive program 90. Various exemplary embodiments a described below which detail several possible ways in which biometric data can be used to affect the state of the interactive program 90.

Figure 6:
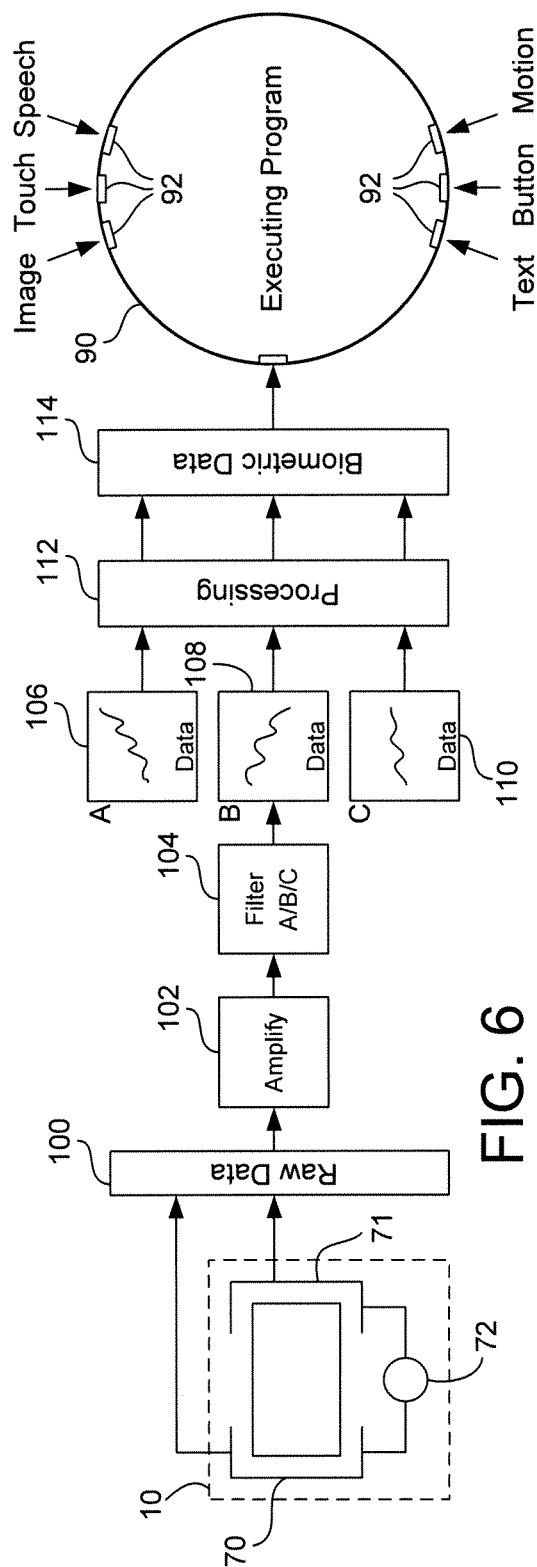
FIG. 6 illustrates a process for using bio-signals to affect an interactive program, in accordance with an embodiment of the invention.

With reference to FIG. 6, a diagram illustrating a process for using bio-signals to affect an interactive program is shown, in accordance with another embodiment of the invention. As shown, the handheld device 10 includes electrodes 70 and 71 which detect bio-electric signals from a user holding the handheld device 10. The detected bio-electric signals constitute raw signal data 100, which is transmitted to an amplifier 102. The amplifier 102 amplifies the raw signal data, and transmits the amplified raw signal to a filter 104. The filter 104 filters the amplified raw signal to determine different kinds of bio-signal data 106, 108, and 110.

In one embodiment, the bio-signal data includes GSR signal data, EMG signal data, and ECG signal data. In other embodiments, the filtered bio-signal data may include other types of bio-signal data. In one embodiment, the filter 104 multiplexes the filtering of the amplified raw bio-electric signal data.

The filtered bio-signal data 106, 108, and 110 are transmitted to a processing module 112. The processing module 112 analyzes the bio-signal data 106, 108, and 110, to determine various kinds of biometric data 114. As discussed previously, the biometric data 114 may include any of various kinds of data determined based on analysis of the bio-signals, such as instantaneous GSR, EMG, and ECG values, short-term and long-term changes, etc.

In some embodiments, the biometric data 114 may include metrics which are based on a combination of the bio-signals. For example, in one embodiment an aggregate biometric utilizing a combination of GSR, EMG and ECG data is determined. In other embodiments, an aggregate biometric may utilize two or more of the bio-signals. In various embodiments of the invention, the biometric data 114 may include any type of biometric that may be derived from analysis of the bio-signal data.

The biometric data 114 is provided to the executing interactive program 90. The biometric data 114 affects a state of the interactive program 90. Additionally, the interactive program 90 is configured to receive various other types of input 92, such as image input, touch input, speech input, text input, button input, motion input, etc.

Figure 7:
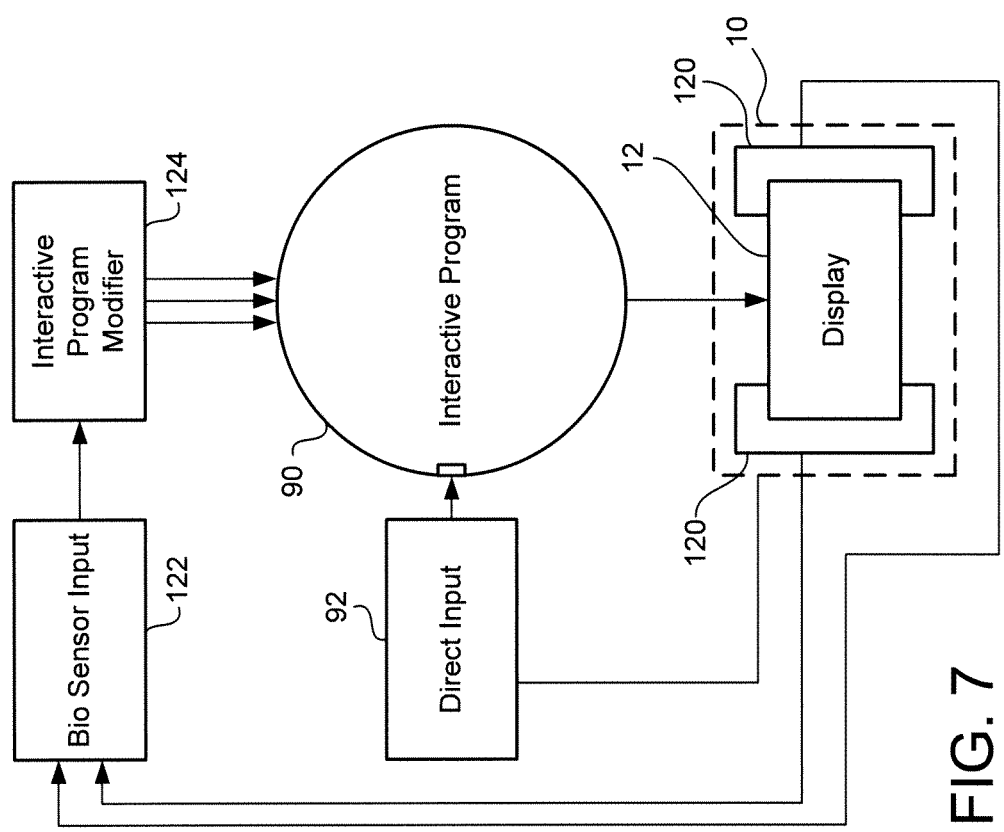
FIG. 7 illustrates a circular process wherein bio-sensor input is utilized to affect the state of an interactive program, which in turn affects the biosensor input.

With reference to FIG. 7, a diagram illustrating a circular process wherein bio-sensor input is utilized to affect the state of an interactive program, which in turn affects the biosensor input. As shown, a handheld device 10 includes a display 12 for displaying an interactive program 90 to a user. The handheld device 10 also includes bio-sensors 120, which detect biometric data of the user. In one embodiment, the bio-sensors 120 include electrodes which detect bio-electric signals of the user, the bio-electric signals being filtered and processed to determine the bio-sensor input 122. The bio-sensor input 122 is utilized by an interactive program modifier 124 to modify a state of the interactive program 90. The handheld device 10 also detects other types of input from the user, and transmits these other inputs as direct input 92 to the interactive program 90.

The interactive program 90 is configured to provide an interactive experience to the user, wherein the interactive program 90 is responsive to both the direct input 92 and the bio-sensor input 122. The interactive program 90 provides output to the display 12 of the handheld device. Additionally, the interactive program 90 may provide additional types of output to the handheld device 10 which enhance the interactive experience for the user, such as audio output and tactile output (not shown). These various kinds of output from the interactive program 90 are rendered by the hardware of the handheld device 10 such as display 12 to enable the user to experience and respond to the current state of the interactive program 90.

As the user experiences the current state of the interactive program 90, the user provides input in response. In one embodiment, the user provides direct input 92 in an intentional manner to the interactive program 90. Examples of such intentional input may include pressing buttons, moving a joystick, moving or changing the orientation of the handheld device, and other types of intentional actions taken by the user in response to the current state of the interactive program and detected by the handheld device 10. In embodiments of the invention, these kinds of intentional inputs may be provided by the user in order to cause an intended change in the state of the interactive program. For example, the direct inputs may cause a character controlled by the user to take a specific action, indicate entry of a command, or otherwise affect some aspect of the interactive program which the user intends to change.

Furthermore, in one embodiment, the user provides non-intentional input via the bio-sensor input 122, in reaction to the current state of the interactive program 90. Examples of such non-intentional input may include GSR, EMG and ECG signal data, as well as input data derived from such signal data. For example, as the user becomes more or less stressed as a result of interacting with the interactive program 90, the user's bio-sensor input 122 may change. This bio-sensor input 122 is then used by the interactive program modifier 124 to affect the state of the interactive program 90. The modified state of the interactive program 90 then becomes the updated current state of the interactive program 90, which is rendered by the handheld device 10 to the user. This updated current state of the interactive program 90 will in turn evoke a response from the user that is again detected by the bio-sensors 120 to generate new bio-sensor input 122 that will in turn be used by the interactive program modifier 124 to affect the state of the interactive program 90. Thus, a cyclical response mechanism is provided in which the interactive program 90 evokes a physiological response from the user, and that response causes changes to the state of the interactive program, which in turn affects the physiological response of the user.

In various embodiments, the interactive program modifier may modify any aspect of the interactive program 90 in response to the bio-sensor input 122. For example, in one embodiment, if it is determined that the stress level of the user is too low as determined based on the bio-sensor input, then the interactive program modifier 124 may affect the interactive program 90 in a manner designed to increase the stress level of the user. Whereas, if the stress level of the user is determined to be too high, then the interactive program modifier 124 may affect the interactive program 90 so as to decrease the user's stress level. In additional embodiments of the invention, the interactive program modifier 124 may affect the state of interactive program 90 in any way based on the bio-sensor input 122.

Figure 8:
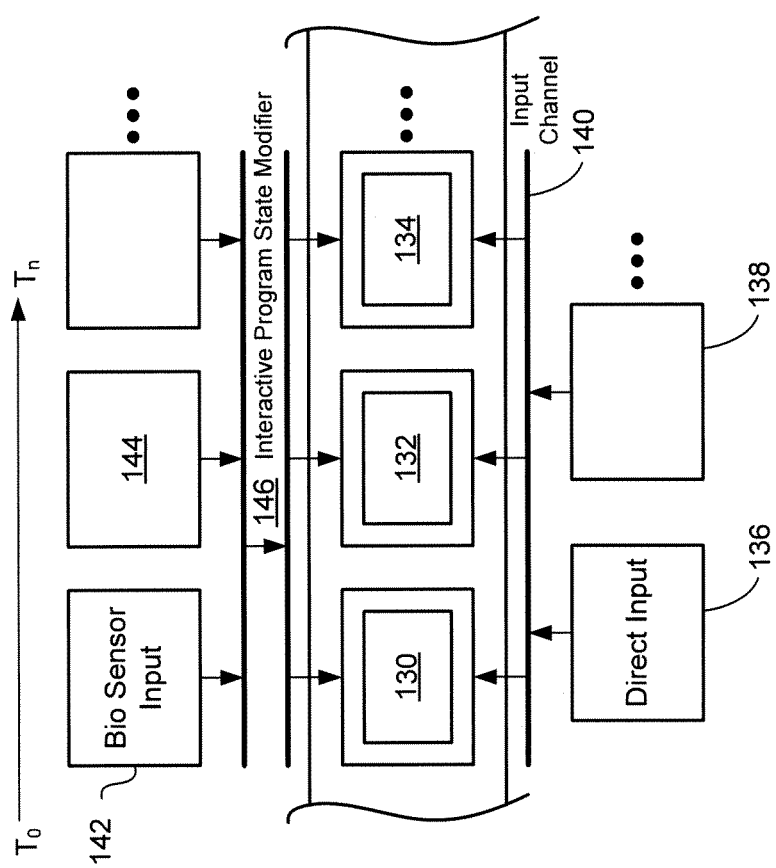
FIG. 8 illustrates a conceptual timeline illustrating a method for affecting a state of an interactive program, in accordance with an embodiment of the invention.

With reference to FIG. 8, a conceptual timeline illustrating a method for affecting a state of an interactive program is shown, in accordance with an embodiment of the invention. A current state of the interactive program is represented by the scene 130, shown on an imaginary filmstrip for illustrative purposes only. Direct input 136 is received from a user of the interactive program. As previously discussed, examples of direct input include intentional actions of the user, such as pressing buttons on a controller, activating a joystick or other directional mechanism, providing motion sensor based input, etc. The direct input 136 is provided via an input channel 140 so as to affect the state of the interactive program. Additionally, biosensor input 142 is captured from the user, the biosensor input being descriptive of physiological characteristics of the user. Examples of biosensor input include GSR, EMG, or ECG data and related physiological data derived from such data. The biosensor input 142 is received by an interactive program state modifier 146, which causes modification of the state of the interactive program based on the particulars of the biosensor input 142. Thus, both the biosensor input 142 and the direct input 136 affect the state of the interactive program, resulting in an updated state of the interactive program that is represented by an updated scene 132. Based on this updated scene 132, the user again may provide direct input 138 as well as biosensor input 144, resulting in another updated scene 134. As this process is continuously repeated, the user is provided with an interactive experience with the interactive program that is affected by both the user's direct input and physiologically-based biosensor input.

Figure 9:
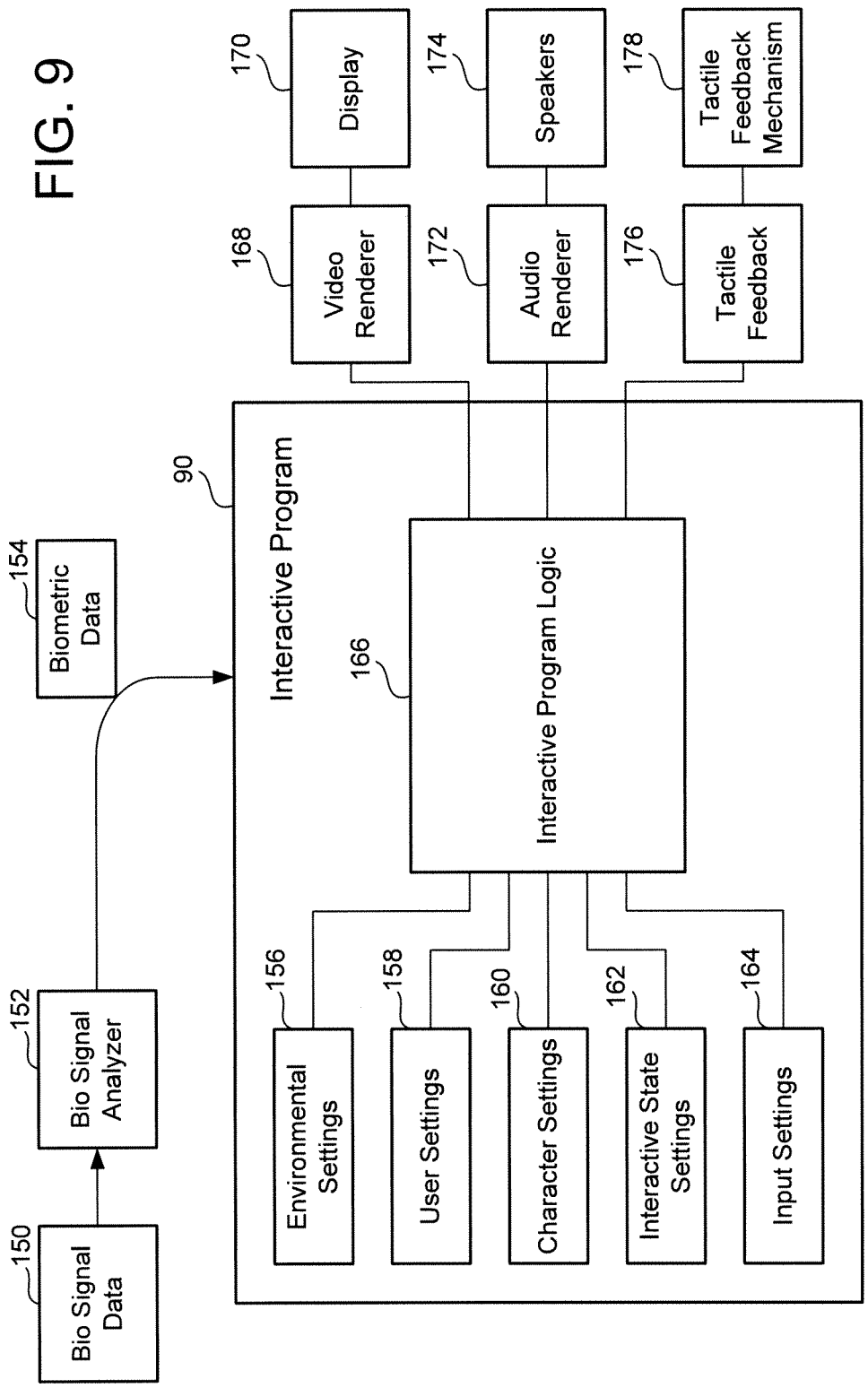
FIG. 9 illustrates a system for rendering an interactive program to a user, in accordance with an embodiment of the invention.

With reference to FIG. 9, a system for rendering an interactive program to a user is shown, in accordance with an embodiment of the invention. As shown, an interactive program 90 is provided, the interactive program having an interactive program logic 166. The interactive program logic 166 continually executes to determine the current state of the interactive program. The interactive program logic 166 generates data reflective of the current state in the form of video data, audio data, and tactile feedback data. The video data is output to a video renderer 168, which processes the video data to provide a signal to a display 170, thereby rendering video to the user. Similarly, the audio data is output to an audio renderer 172, which processes the audio data to provide a signal to speakers (or headphones) 174, thereby rendering audio to the user. Also, the tactile feedback data is provided to a tactile feedback renderer 176, which processes the tactile feedback data to provide a signal to tactile feedback mechanism 178, thereby providing tactile feedback to the user. While the foregoing embodiment has been described with reference to video data, audio data, and tactile feedback data as forms of data representative of the current state of the interactive program, in other embodiments, there may be other forms of data that are representative of the current state of the interactive program. Other examples may include, data relating to lighting functionality, movement of objects, resistance, force feedback, and other types of data which are representative of the current state of the interactive program 90. The data representative of the current state of the interactive program 90 are processed or otherwise rendered to provide an interactive experience to the user.

In one embodiment, the interactive program logic 166 is configured to read or receive a number of settings which in turn are processed by the executing interactive program logic 166 so as to generate the current state of the interactive program. For example, in one embodiment, environmental settings 156 are provided, which include settings, data, or information related to control of global or environmental aspects of the interactive program 90. Examples of environmental settings may include settings for video properties of the video data output by the interactive program logic 166 such as brightness or contrast, audio properties such as volume, tactile feedback properties such as intensity, and other types of global and environmental properties which may be adjusted for the interactive program 90. Additionally, the interactive program 90 may include user settings 158, which includes settings, data, or information related to the user. For example, in various embodiments the user settings 158 may include relatively static information, such as the user's age, height, weight, etc., or more potentially dynamic information, such as the user's location. The user settings 158 might also include various preferences of the user regarding the interactivity with the interactive program 90, such a preferred level of difficulty, or other types of user preferences. In some embodiments, character settings 160 may be provided, the character settings 160 including settings, data, or information related to characters of the interactive program 90, which may or may not be controlled by the user. Examples of character settings in various embodiments may include character type, attributes such as health or energy levels, lives, speed, abilities, visual features of the character, clothing, weapons characteristics such as damage levels and accuracy, and other types of data related to a character in the interactive program 90. In one embodiment, interactive state settings 162 are provided, the interactive state settings including various settings, data, or information related to the interactive state of the interactive program 90. Examples of interactive state settings may include data identifying a particular stage, level of progression or advancement (e.g. within a campaign), as well as settings or data associated with the particular stage. In one embodiment, input settings 164 are provided, the input settings including various settings, data, or information related to input provided by the user. For example, in various embodiments, the input settings 164 may include settings related to devices that the user manipulates in order to provide input, such as buttons, joysticks, etc., or settings which govern how the input that is provided by the user is interpreted, such as functionality settings, intensity settings, and other types of input-related settings.

With continued reference to FIG. 9, bio-signal data 150 of the user is provided via various bio-sensors as previously discussed. The bio-signal data 150 is processed by a bio-signal analyzer 152 to determine biometric data 154. The biometric data 154 include various types of biometric or physiological data which may be utilized to affect a state of the interactive program 90. Examples of biometric data have been discussed, and include both instantaneous measurements such as GSR, ECG, and EMG values, as well as derivative data such as changes in the values, average values over a preceding time period, heart rate, respiration, etc. Additionally, the biometric data 154 may include composite measures based on multiple types of bio-signal data. The biometric data 154 is received by the interactive program 90 and may be applied in various ways so as to affect the state of the interactive program 90. In some embodiments, the biometric data is applied in manner so as to affect one or more of the aforementioned environmental settings 156, user settings 158, character settings 160, interactive state settings 162, or input settings 164. In other embodiments, the biometric data 150 is applied in a manner affecting the operation of the interactive program logic 166. In either case, the result is an altered state of the interactive program, which is reflected in the video data, audio data, and tactile feedback data output from the interactive program 90. The user then experiences this altered state of the interactive program via the display 170, speakers 174, and tactile feedback mechanism 178.

Figure 10:
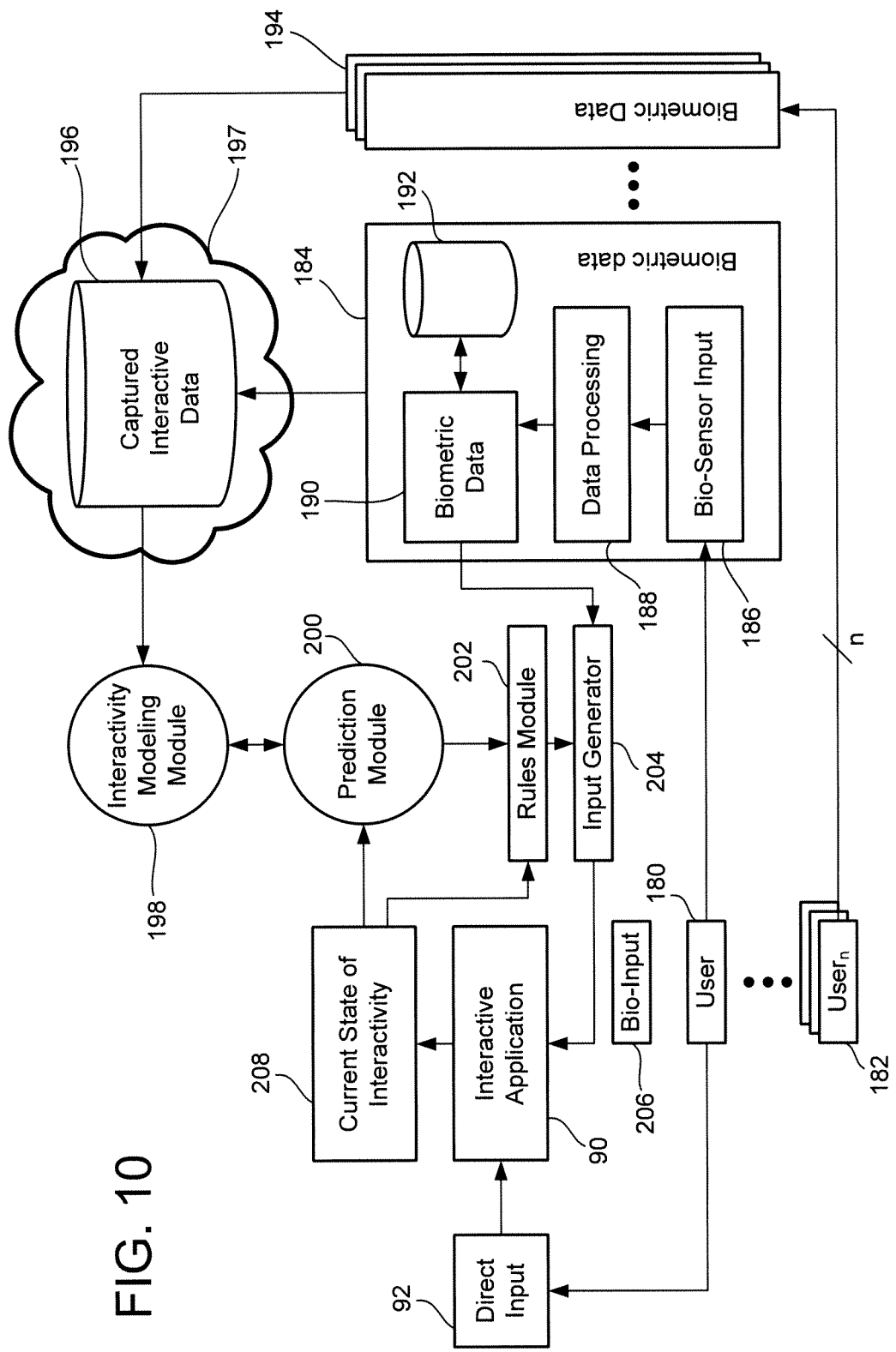
FIG. 10 illustrates a system for processing biometric data for an interactive application, in accordance with an embodiment of the invention.

With reference to FIG. 10, a system for processing biometric data for an interactive application is provided, in accordance with an embodiment of the invention. A user 180 provides direct input 92 to an interactive application 90. The direct input 92 constitutes intentional input from the user, such as button presses, directional pad or joystick movements, motion input, etc. The interactive application 90 is also configured to receive biometric input 206 from the user 180. A system and method for generating the bio-input 206 is herein described in accordance with an embodiment of the invention.

A biometric data processing module 184 is provided for receiving and processing physiological data. Physiological data is detected from a user 180 by a bio-sensor so as to provide bio-sensor input 186. A data processing module 188 then performs processing of the bio-sensor input 186 to provide biometric data 190. The biometric data 190 is stored locally in a biometric data storage 192. The biometric data processing module 184 communicates biometric data to a captured interactive data storage 196. The aforementioned components and processes for generating biometric data may be duplicated for any number of users 182 with corresponding biometric data processing modules 194, each of the biometric data processing modules 194 also communicating biometric data of the various users to the captured interactive data storage 196. The captured interactive data storage 196 may be accessible via a network 197. Thus, the captured interactive data storage 196 aggregates biometric data from multiple users. Though not specifically shown, in various embodiments, the captured interactive data storage 196 may also aggregate other types of interactive data, such as direct input data, and other kinds of data related to interactivity with an interactive application.

An interactivity modeling module 198 analyzes data from the captured interactive data storage 196 to generate models for predicting activity of a user during interactivity with the interactive application 90. The predicted activity of the user may include predictive data regarding future inputs from the user, such as future direct input and bio-input. In one embodiment, the predicted activity may include predictive data regarding future states of the interactive application resulting from the user's interactivity with the interactive application. A prediction module 200 utilizes data from a current state of interactivity 208 and the models generated by the interactivity modeling module 198 in order to predict the activity of the user 180. Based on the predicted activity of the user as well as the current state of interactivity 208, a rules module 202 applies various rules to an input generator 204 which determines the bio-input 206 based on the biometric data 190. In various embodiments, the rules module 202 may apply various rules which determine what kinds of biometric data are utilized as input, when they are to be utilized, and how they are to be utilized. Thus, the bio-input 206 supplied to the interactive application 90 is adjusted based in part on the predicted activity of the user.

Figure 11:
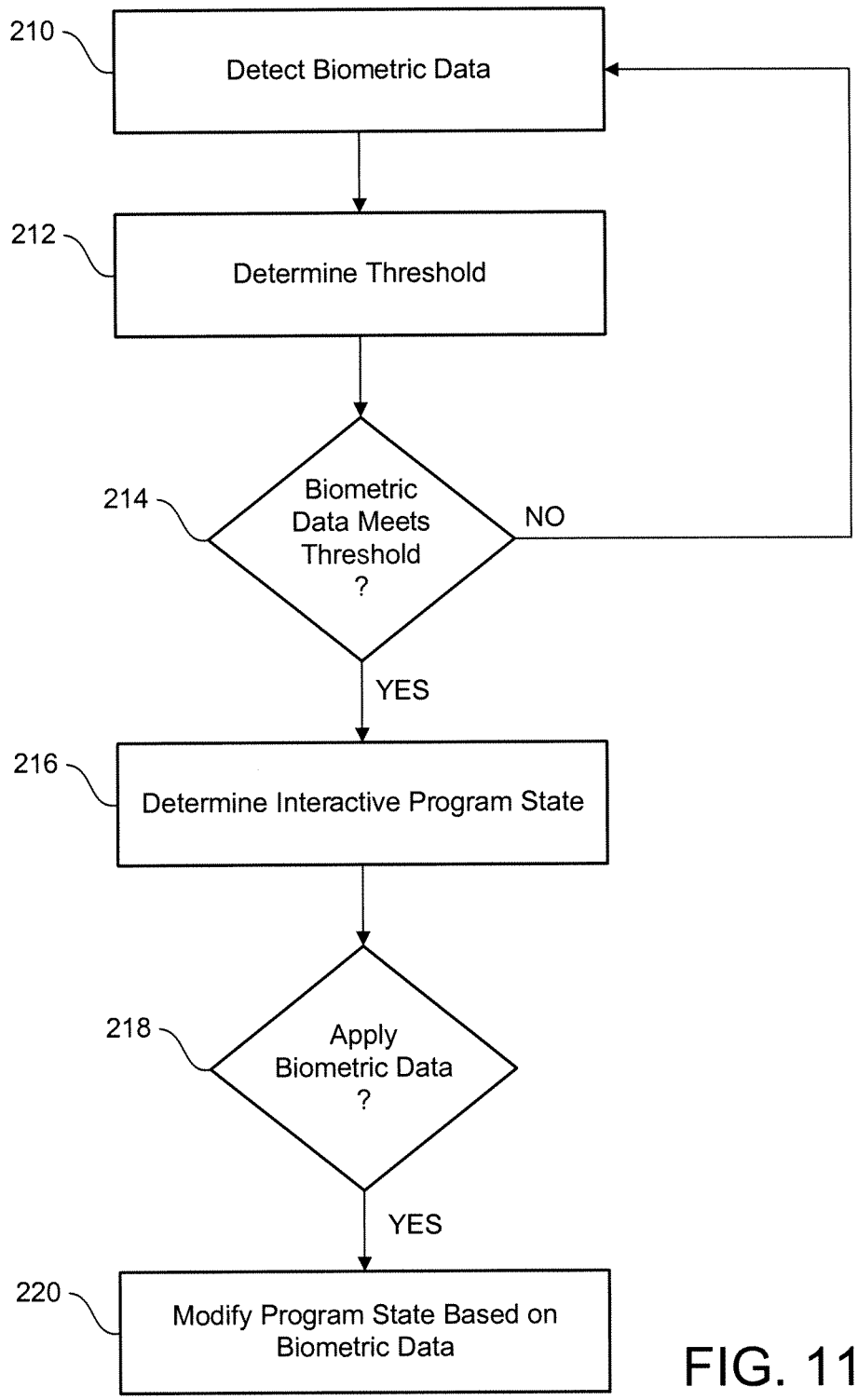
FIG. 11 illustrates a method for applying biometric data from a user to an interactive program, in accordance with an embodiment of the invention.

With reference to FIG. 11, a method for applying biometric data from a user to an interactive program is shown, in accordance with an embodiment of the invention. At method operation 210, biometric data is detected. At method operation 212, a detection threshold is determined for the biometric data. In one embodiment, the detection threshold is determined so as to enable determination of whether the biometric data represents a true physiological phenomena on the part of the user of the interactive program. In other embodiments, the detection threshold may be determined so as to distinguish significant events from non-significant events in the course of detection of the biometric data. At method operation 214, it is determined whether or not the biometric data meets the detection threshold. If not, then the method returns to method operation 210. If so, then the method proceeds to method operation 216, wherein a state of the interactive program is determined. At method operation 218, it is determined whether or not the apply the biometric data. And if so, then at method operation 220, the state of the interactive program is modified based on the biometric data.

Figure 12:
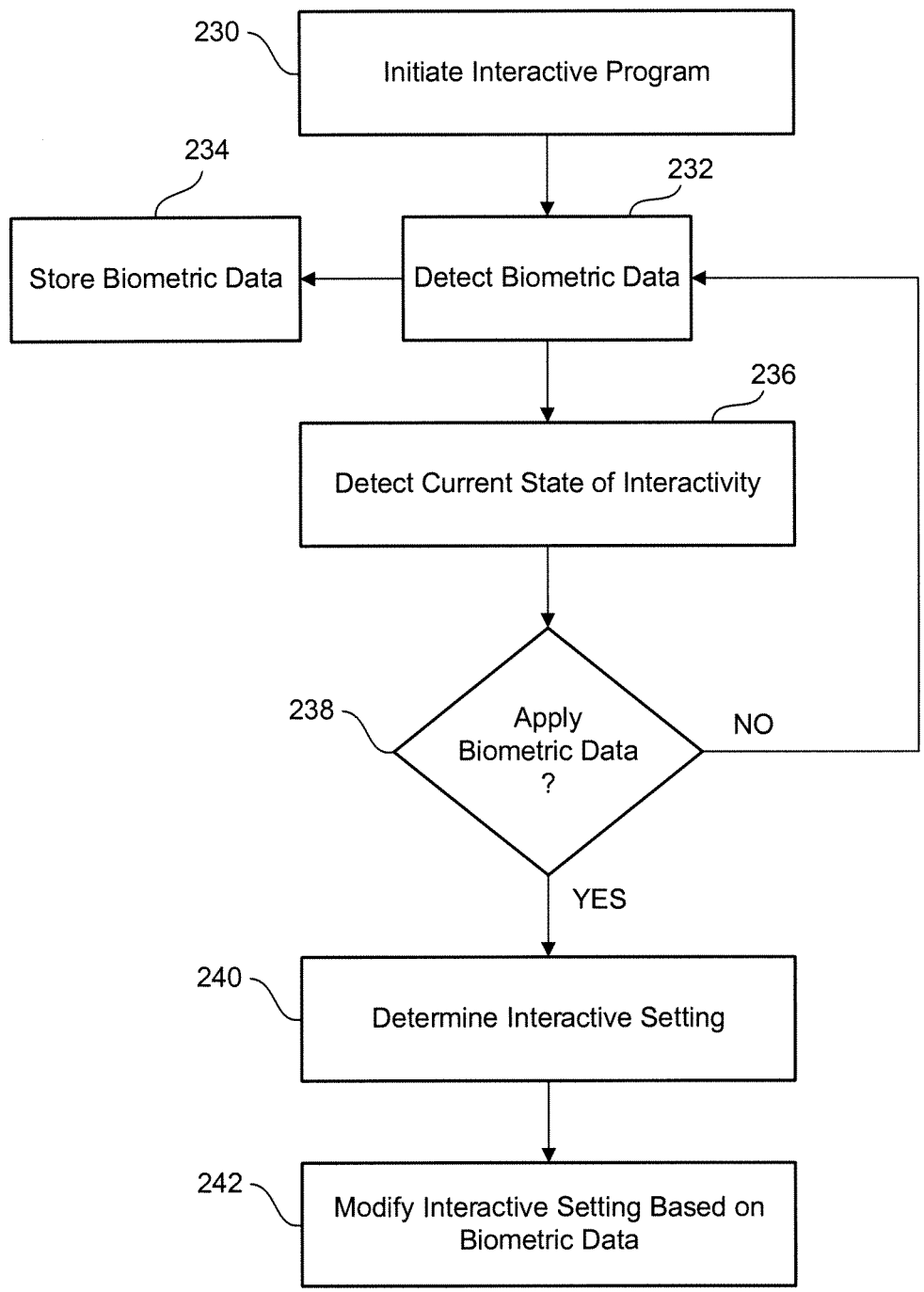
FIG. 12 illustrates a method for applying biometric data to an interactive program, in accordance with an embodiment of the invention.

With reference to FIG. 12, a method for applying biometric data to an interactive program is shown, in accordance with an embodiment of the invention. At method operation 230, an interactive program is initiated. At method operation 232, biometric data of a user of the interactive program is detected. At method operation 234, the biometric data is stored. At method operation 236, the current state of interactivity of the interactive program is detected. And at method operation 238, based on the current state of interactivity, it is determined whether or not to apply the biometric data. If not, then the method returns to method operation 232. If so, then the method proceeds to method operation 240, wherein an interactive setting of the interactive program is determined. At method operation 242, the interactive setting of the interactive program is modified based on the biometric data.

Figure 13:
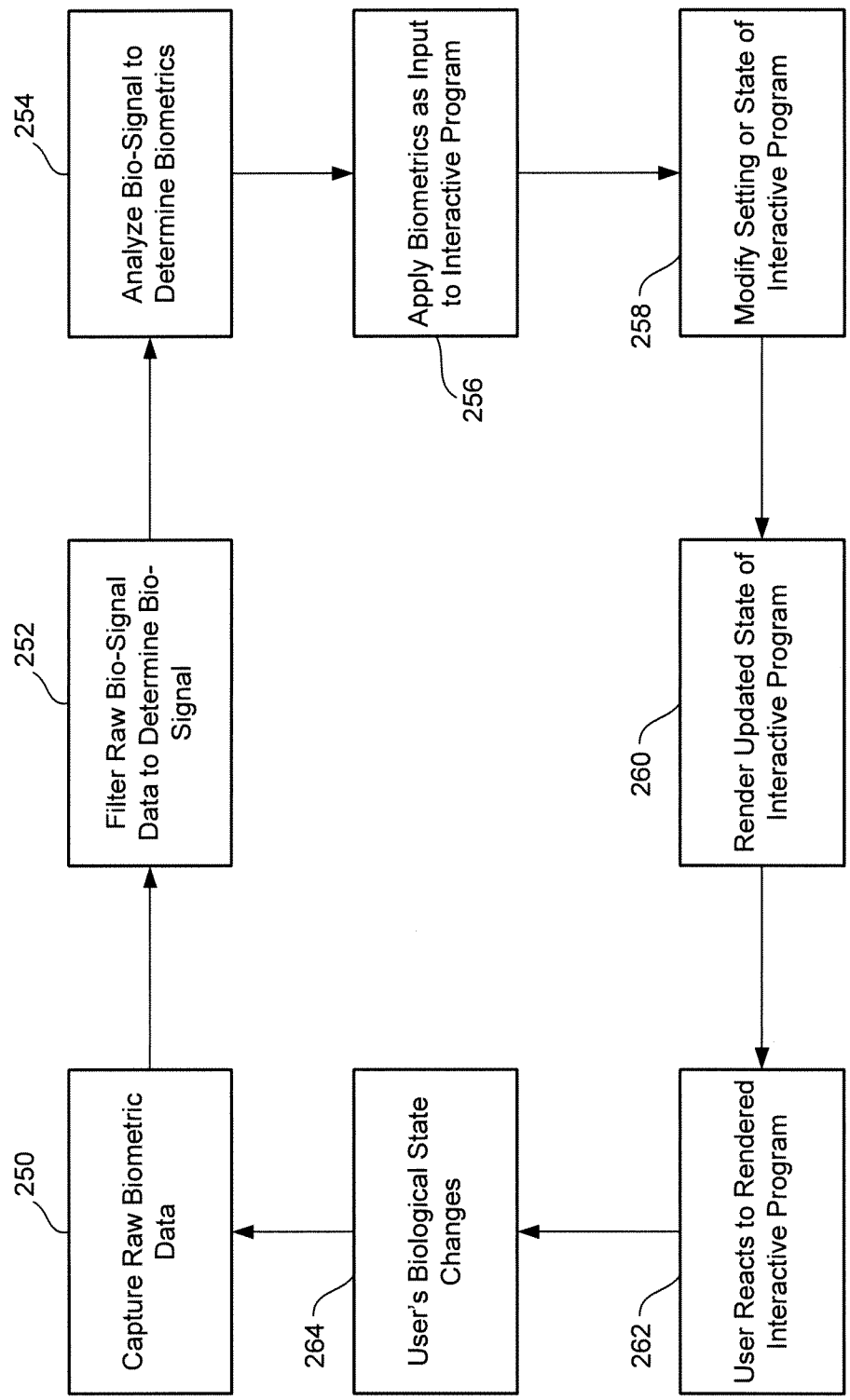
FIG. 13 illustrates a method for applying biometric data to an interactive program, in accordance with an embodiment of the invention.

With reference to FIG. 13, a method for applying biometric data to an interactive program is shown, in accordance with an embodiment of the invention. At method operation 250, raw bio-signal data is captured. At method operation 252, the raw bio-signal data is filtered so as to determine the bio-signal of the user of the interactive program. At method operation 254, the bio-signal is analyzed so as to determine biometrics of the user. At method operation 256, the biometrics are applied as input to the interactive program. At method operation 258, a setting or state of the interactive program is modified based on the biometrics. At method operation 260, an updated state of the interactive program is rendered to the user, reflecting the modification of the setting or state of the interactive program. At method operation 262, the user reacts to the rendered interactive program. And at method operation 264, the user's biological/physiological state changes. This changed physiological state is once again captured as raw bio-signal data at method operation 250. Thus, the illustrated method functions as a response or feedback loop in which the user's biological state affects the interactive program, which in turn affects the user's biological state.

The aforementioned biometric data may be applied to affect interactivity with an interactive program in any number of ways. The following exemplary embodiments describe only some of the possibilities for usage of biometric data in the context of an interactive program. It will be understood by those skilled in the art that in other embodiments of the invention, the biometric data may be utilized in other ways which affect interactivity with an interactive program. In the following embodiments, reference will be made generally to increases or decreases in a user's stress level. The user's stress level may be determined based on one or more biometric data measures as described above, such the user's GSR, EMG, or ECG signal data, or data measures derived from physiological data such as these, such as heart rate, respiration, tonic changes, phasic changes, etc. Increases in GSR, EMG, and ECG levels may generally be associated with increases in the user's stress level, as well as increases in heart rate, respiration, and other measures. Conversely, decreases in GSR, EMG and ECG levels, and associated decreases in heart rate and respiration, may generally be associated with a decrease in the user's stress level.

In one embodiment, wherein the interactive program is a game in which the player fires a weapon, the biometric data could be used to determine characteristics of the use of the weapon. For example, an increase in the user's stress level could cause the weapon to be more accurate. Or an increase in the user's stress level might cause the weapon to be less steady, and therefore more difficult to target accurately. In one embodiment, the weapon may involve targeting through a sniper scope which becomes more steady as the user's stress level is lowered, thus providing the user with an interactive experience in which it is advantageous to remain calm for ease of targeting.

In another embodiment, the user could charge a weapon by tensing their hands and arms, wherein the tensing of the hands and arms causes the user's EMG to increase, which is detected and utilized to charge the weapon. In other embodiments, the user could charge other types of items by tensing their hands and arms, such as shields, or otherwise affect properties of an object or character. For example, a user could tense their hands or arms, and thereby increase the ability of their character, vehicle, or other item which may sustain damage, to withstand an attack, collision, or other type of damage-inducing event.

In one embodiment, the biometric data may be used to affect attributes of a character in the interactive program. For example, the character might exhibit facial expressions, movements, posture, sounds, physical changes and other attributes which are reflective of the biometric data of the user. In one embodiment, the character may appear to breathe in synchronization with the respiration of the user. The character may also appear to breathe deeper as the user breathes deeper. In one embodiment, the character may appear to perspire when the stress level of the user increases. Or the character may exhibit changing facial expressions, such as widening eyes, in response to increased stress level of the user. In one embodiment, the visual appearance of the character, such as the character's color or other visual attributes, may change in response to changes in the user's stress level. In still other embodiments, the character may exhibit any kind of change which is reflective of the changes in the user's stress level as determined from the user's biometric data.

In still other embodiments, actions of the character might be affected by the user's biometric data. For example, in various embodiments, a character may be capable of moving or running faster, jumping higher, punching or kicking harder or faster, throwing an object farther, hitting an object harder or faster, or otherwise performing some physical activity with greater intensity or speed, as the user's stress level increases.

In other embodiments, other types of attributes of a character may be adjusted based on the user's biometric data. For example, a level of health or energy of a character might be increased as a result of increases in the user's stress level. Or the level of health or energy might be depleted more rapidly as a result of a higher stress level on the part of the user.

In one embodiment, the action performed by the interactive program in response to a direct input might vary depending upon the user's biometric data. For example, pressing a button when the user is at a low stress level may cause one type of action, while pressing the same button when the user is at a high stress level may cause a different action. This concept may be applied to various scenarios. For example, as the user's stress level changes, the type of attack executed by a character as a result of pressing a button could change.

In one embodiment, ambient conditions such as background music, audio settings, background scenery, or display properties could be adjusted in response to the user's stress level. For example, audio volume or the audio level of a specific item or character within the interactive program could increase as the stress level of the user increases. In one embodiment, the type of music played could be designed to match the stress level of the user, becoming more intense as the user's stress level increases, or more relaxed as the user's stress level decreases. In another embodiment, the music might be adjusted in an opposite manner, so as to counteract changes in the user's stress level. For example, the music might become more relaxed when the user's stress level is high or has increased, so as to promote a decrease in the user's stress level. In one embodiment, properties of the display of the interactive program could change in response to the user's stress level. For example, brightness or contrast might be increased as the user's stress level increases, or the brightness or contrast of specific items or characters might be selectively increased. In another embodiment, a zoom level which affects the amount of a scene which is viewable by the user might be adjusted based on the user's stress level. For example, the zoom could be increased as the user's stress level increases, thus reflecting a heightened sense of focus.

In other embodiments, the level of stress of the user could be utilized to affect the level of difficulty of the interactive program. In one embodiment, as the stress level of the user increases, the level of difficulty is reduced.

Figure 14:
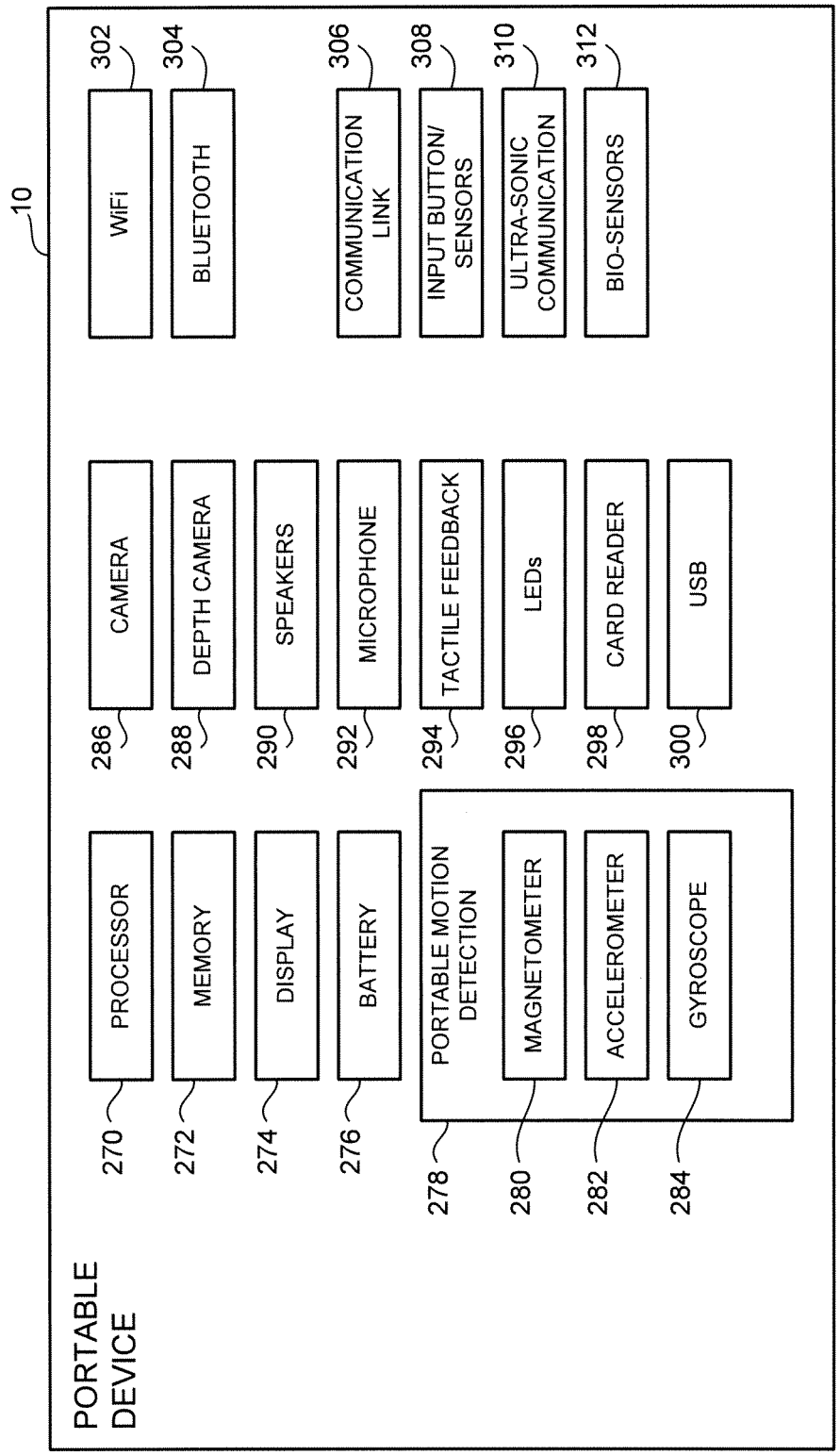
FIG. 14 illustrates components of a portable device, in accordance with an embodiment of the invention.

With reference to FIG. 14, a diagram illustrating components of a portable device 10 is shown, in accordance with an embodiment of the invention. The portable device 10 includes a processor 270 for executing program instructions. A memory 272 is provided for storage purposes, and may include both volatile and non-volatile memory. A display 274 is included which provides a visual interface that a user may view. A battery 276 is provided as a power source for the portable device 10. A motion detection module 278 may include any of various kinds of motion sensitive hardware, such as a magnetometer 280, an accelerometer 282, and a gyroscope 284.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 282 are used to provide the direction of gravity, which gives an absolute reference for 2 angles (world-space pitch and world-space roll).

A magnetometer measures the strength and direction of the magnetic field in the vicinity of the controller. In one embodiment, three magnetometers 280 are used within the controller, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 282 is used together with magnetometer 280 to obtain the inclination and azimuth of the portable device 10.

A gyroscope is a device for measuring or maintaining orientation, based on the principles of angular momentum. In one embodiment, three gyroscopes 284 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 286 is provided for capturing images and image streams of a real environment. More than one camera may be included in the portable device 10, including a camera that is rear-facing (directed away from a user when the user is viewing the display of the portable device), and a camera that is front-facing (directed towards the user when the user is viewing the display of the portable device). Additionally, a depth camera 288 may be included in the portable device for sensing depth information of objects in a real environment.

The portable device 10 includes speakers 290 for providing audio output. Also, a microphone 292 may be included for capturing audio from the real environment, including sounds from the ambient environment, speech made by the user, etc. The portable device 10 includes tactile feedback module 294 for providing tactile feedback to the user. In one embodiment, the tactile feedback module 294 is capable of causing movement and/or vibration of the portable device 10 so as to provide tactile feedback to the user.

LEDs 296 are provided as visual indicators of statuses of the portable device 10. For example, an LED may indicate battery level, power on, etc. A card reader 298 is provided to enable the portable device 10 to read and write information to and from a memory card. A USB interface 300 is included as one example of an interface for enabling connection of peripheral devices, or connection to other devices, such as other portable devices, computers, etc. In various embodiments of the portable device 10, any of various kinds of interfaces may be included to enable greater connectivity of the portable device 10.

A WiFi module 302 is included for enabling connection to the Internet via wireless networking technologies. Also, the portable device 10 includes a Bluetooth module 304 for enabling wireless connection to other devices. A communications link 306 may also be included for connection to other devices. In one embodiment, the communications link 306 utilizes infrared transmission for wireless communication. In other embodiments, the communications link 306 may utilize any of various wireless or wired transmission protocols for communication with other devices.

Input buttons/sensors 308 are included to provide an input interface for the user. Any of various kinds of input interfaces may be included, such as buttons, touchpad, joystick, trackball, etc. An ultra-sonic communication module 310 may be included in portable device 10 for facilitating communication with other devices via ultra-sonic technologies.

Bio-sensors 312 are included to enable detection of physiological data from a user. In one embodiment, the bio-sensors 312 include one or more dry electrodes for detecting bio-electric signals of the user through the user's skin.

The foregoing components of portable device 10 have been described as merely exemplary components that may be included in portable device 10. In various embodiments of the invention, the portable device 10 may or may not include some of the various aforementioned components. Embodiments of the portable device 10 may additionally include other components not presently described, but known in the art, for purposes of facilitating aspects of the present invention as herein described.

The foregoing portable device, and its included components, constitutes means for applying biometric data to an interactive program. The portable device constitutes means for capturing raw bio-signal data. The portable device constitutes means for filtering the raw bio-signal data so as to determine the bio-signal of the user of the interactive program. The portable device constitutes means for analyzing the bio-signal so as to determine biometrics of the user. The portable device constitutes means for applying the biometrics as input to the interactive program. The portable device constitutes means for modifying a setting or state of the interactive program based on the biometrics. The portable device constitutes means for rendering an updated state of the interactive program to the user, reflecting the modification of the setting or state of the interactive program. The portable device constitutes means for enabling the user to react to the rendered interactive program, so that the user's biological/physiological state changes. The portable device constitutes means for capturing this changed physiological state as raw bio-signal data. Thus, the portable device constitutes means for facilitating a response or feedback loop in which the user's biological state affects the interactive program, which in turn affects the user's biological state.

Additionally, while foregoing embodiments have made reference to intentional inputs such as a button or joystick, as opposed to bio-sensor inputs, it is recognized that bio-sensor inputs can be utilized in an intentional manner as well. In other words, the user may intentionally provide varied kinds of bio-input to the bio-sensor of a handheld device or controller. Various related and alternative embodiments may be described wherein a user provides biometric input in an intentional manner. For example, detected EMG data may be intentionally provided by the user, as the user can intentionally control the muscle activity in their fingers and arms. In one embodiment, the aforementioned bio-sensors may be configured to function in a manner similar to buttons. Based on the detected GSR or EMG, it is possible to determine whether or not a user is touching a particular electrode and the degree of pressure applied. For as the user applies greater pressure with a finger, the contact area increases, which decreases the GSR, and causes an increase in EMG activity due to the muscle activity required to press the finger against the electrode.

In other embodiments, a user can intentionally control their heart beat and respiration so as to intentionally provide certain types of biometric data. In one embodiment, an interactive application may be configured to promote development of the user's ability to control their heart beat and respiration. Such an interactive application might teach stress reduction techniques which enable a user to lower their heart beat and respiration.

With reference to FIG. 15, in one embodiment, a handheld device for applying biometric input to an interactive application module is provided. The handheld device 10 includes a processor 320, which executes an interactive application module 322. The handheld device 10 also includes an input mechanism 326 for receiving intentional input from a user 33, and a biometric sensor 328 for detecting biometric data of the user 33. The handheld device further includes a biometric processing module 324 executed by the processor 320. The biometric processing module 324 receives the biometric data from the biometric sensor 328 and processes the biometric data to determine a bio-input characteristic. In various embodiments, the bio-input characteristic may be any kind of biometrically based input parameter which may be utilized by the interactive application module 322. Examples include the aforementioned various types of biometric data and parameter types which are derived from such biometric data. The interactive application module 322 receives the bio-input characteristic and adjusts a state of the interactive application module based on the bio-input characteristic. The handheld device also includes a display 330 for displaying the interactive program module to the user 33.

In one embodiment, the interactive application module 322 determines a relationship between the bio-input characteristic and the state of the interactive application module 322, and adjusts the state of the interactive application module 322 according to the relationship between the bio-input characteristic and the state of the interactive application module 322.

With reference to FIG. 16, in another embodiment, a system for applying biometric input to an interactive application module is provided. The system includes a computer 340 configured to execute an interactive application module 344, and a controller 348 configured to communicate with the computer 340. A display 354 for displaying the interactive application module 344 to a user 33 is connected to the computer 340. In various embodiments, the computer 340 may be any of various computing devices, such as a desktop computer, a server, a gaming console, or other type of computing device capable of executing an interactive application. The display 354 may be any of various display types, such as a television, monitor, LCD, CRT, projector display, or any other kind of display which visually renders an interactive application. The controller 348 includes an input mechanism 352 for receiving intentional input from the user 33, and a biometric sensor 350 for detecting biometric data of the user 33. The computer further includes a biometric processing module 346 which is executed by the processor 342. The biometric processing module 346 receives the biometric data from the biometric sensor 350 and processes the biometric data to determine a bio-input characteristic. The interactive application module 344 receives the bio-input characteristic and adjusts a state of the interactive application module 344 based on the bio-input characteristic. The display 354 connected to the computer 340 displays the updated interactive application module 344 to the user 33.

In one embodiment, the interactive application module 344 determines a relationship between the bio-input characteristic and the state of the interactive application module 344, and adjusts the state of the interactive application module 344 according to the relationship between the bio-input characteristic and the state of the interactive application module 344.

Figure 17:
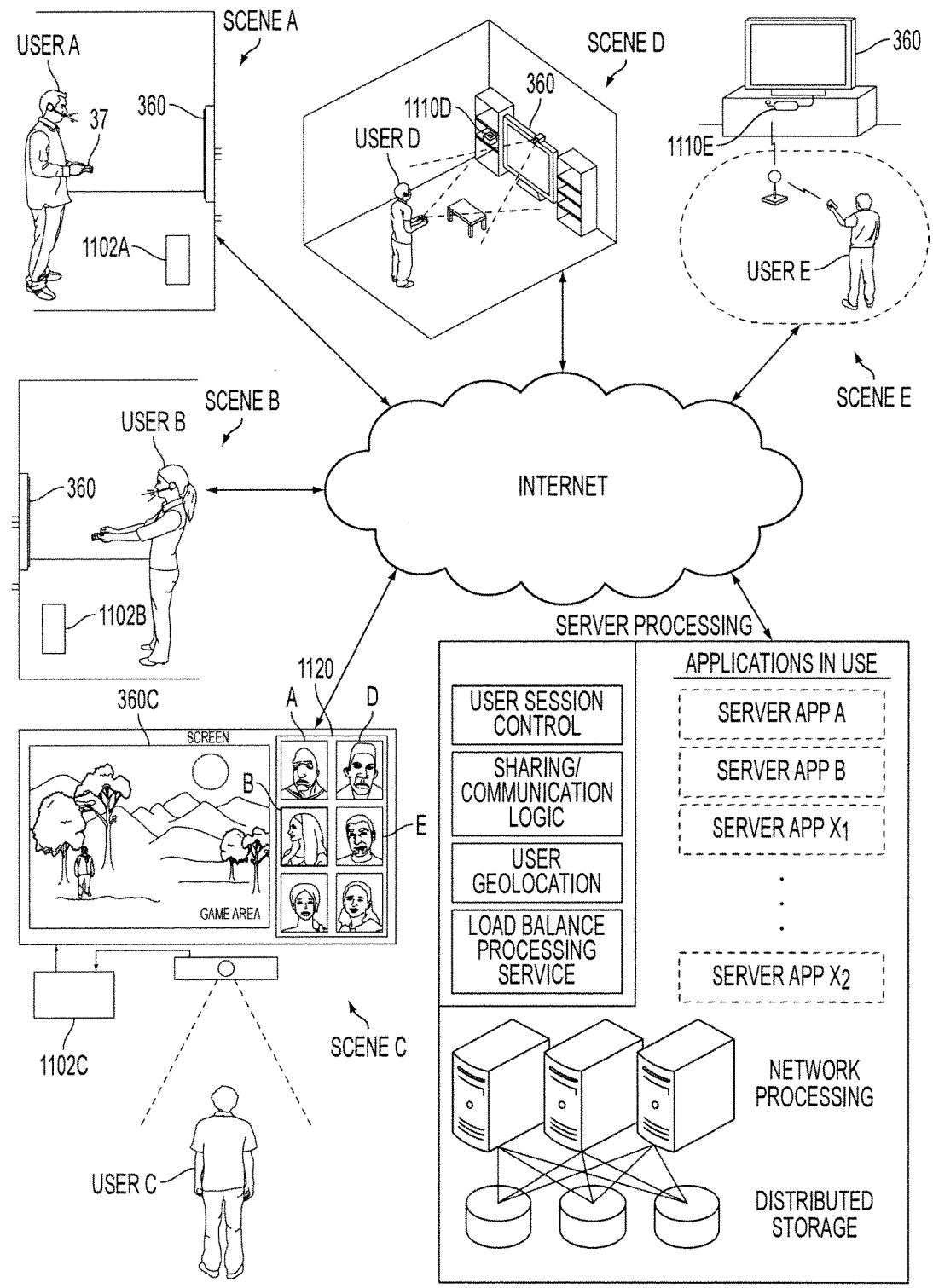
FIG. 17 illustrates multiple scenes with users interacting with game clients that are connected to server processing via the internet, in accordance with an embodiment of the invention.

FIG. 17 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VoIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 17, user A interacts with a client application displayed on a monitor 360 using a controller 37 paired with game client 1102A. Similarly, within scene B, user B interacts with another client application that is displayed on monitor 360 using a controller 37 paired with game client 1102B. Scene C illustrates a view from behind user C as he looks at a monitor displaying a game and buddy list from the game client 1102C. While FIG. 22 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 360C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 18:
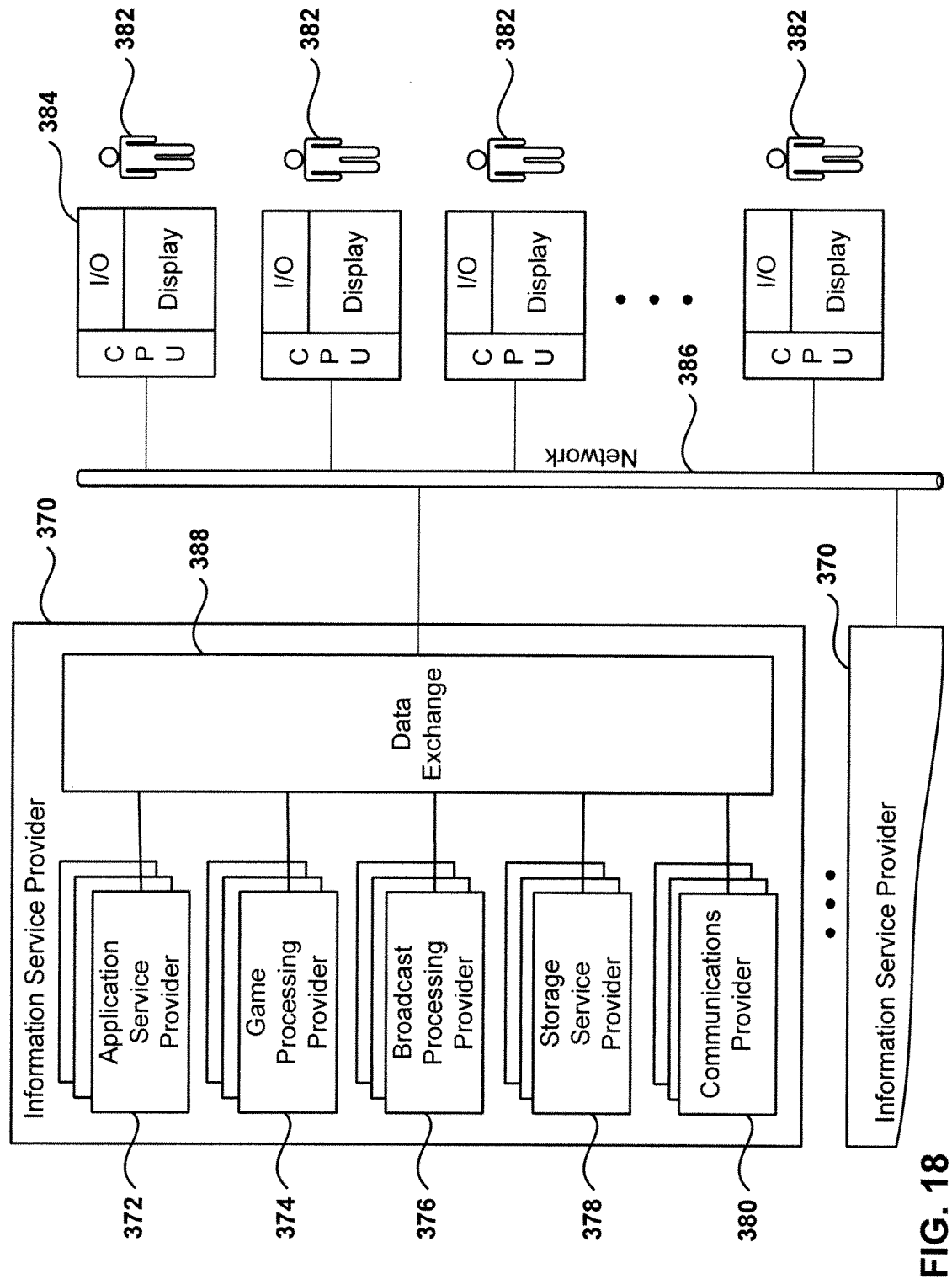
FIG. 18 illustrates an embodiment of an Information Service Provider architecture, in accordance with an embodiment of the invention.

FIG. 18 illustrates an embodiment of an Information Service Provider architecture. Information Service Providers (ISP) 370 delivers a multitude of information services to users 382 geographically dispersed and connected via network 386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 370 includes Application Service Provider (ASP) 372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 370 includes a Game Processing Server (GPS) 374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 388 interconnects the several modules inside ISP 370 and connects these modules to users 382 via network 386. Data Exchange 388 can cover a small area where all the modules of ISP 370 are in close proximity, or can cover a large geographic area when the different modules are geographically dispersed. For example, Data Exchange 388 can include a fast Gigabit Ethernet (or faster) within a cabinet of a data center, or an intercontinental virtual area network (VLAN).

Users 382 access the remote services with client device 384, which includes at least a CPU, a display and I/O. The client device can be a PC, a mobile phone, a netbook, a PDA, etc. In one embodiment, ISP 370 recognizes the type of device used by the client and adjusts the communication method employed. In other cases, client devices use a standard communications method, such as html, to access ISP 370.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing biometric data to affect interactivity during execution of an interactive program, comprising,
   (a) displaying an interactive program on a handheld device, the handheld device including one or more selectable inputs, each of the selectable inputs being for a specific action to be executed by the interactive program;
   (b) detecting the presence of human skin of a user by at least a first sensor and a second sensor of the handheld device;
   (c) reading biometric data obtained from the human skin of the user using the first and second sensors;
   (d) processing the biometric data to determine a bio-input characteristic; and
   (e) analyzing the bio-input characteristic during execution of the interactive program, wherein analyzing the bio-input characteristic includes using a current state of interactivity to predict a future value of the bio-input characteristic; and
   (f) modifying a state of the interactive program using the bio-input characteristic, wherein modifying the state of the interactive program includes adjusting one or more settings including a setting defining an accuracy of an action for at least one of the selectable inputs of the handheld device, the adjusting of the setting defining the accuracy of the action using the predicted future value of the bio-input characteristic;
   wherein biometric data is obtained from bio-signal data that is selected from a group consisting of galvanic skin response signal data, electromuscular signal data, or electrocardio signal data.

2. The method of claim 1, wherein the reading of the biometric data includes,
   receiving raw signal data from the first and second sensors;
   filtering the raw signal data to determine bio-signal data; and
   analyzing the bio-signal data to determine the biometric data.

3. The method of claim 1, wherein method operations (c), (d) and (e) are continuously repeated; and
   wherein the bio-input characteristic changes continuously over time, during execution of the interactive program.

4. The method of claim 1, wherein the one or more settings further include one or more of the following: audio attributes, visual attributes, an attribute of a character in the interactive program, an attribute of an action performed by a character in the interactive program, and a level of difficulty;
   wherein the audio attributes include volume;
   wherein the visual attributes include brightness, zoom, steadiness, and color;
   wherein the attribute of the character includes appearance, color, countenance, and respiration intensity and rate; and
   wherein the attribute of the action performed by the character includes force of an attack action, accuracy of an attack action, and speed of movement.

5. The method of claim 1, wherein the selectable inputs define mechanisms for receiving intentional input from the user, the selectable inputs being selected from the group consisting of button input, touchscreen input, gesture input, and motion input.

6. The method of claim 1, wherein the modifying the state of the interactive program further includes,
   determining a current stage of the interactive program; and
   associating a modification parameter with the current stage, the modification parameter determining the applicability of the bio-input characteristic to a current state of the interactive program.

7. The method of claim 6, wherein the modification parameter determines when the bio-input characteristic is applied to modify the state of the interactive program.

8. The method of claim 1, further comprising:
   storing the biometric data and analyzing the stored biometric data to generate a model for predicting future values of the bio-input characteristic, the current state of interactivity being applied to the model to predict the future value of the bio-input characteristic.

9. The method of claim 1, wherein modifying the state of the interactive program includes adjusting a functionality setting for the at least one of the selectable inputs of the handheld device.

10. A method for affecting interactivity between a user and an interactive application, comprising,
    initiating interactivity between a user and an interactive application displayed on a handheld device;
    monitoring a physiological attribute of the user during the interactivity, the monitoring includes detecting data which describes the physiological attribute from one or more sensors coupled to the handheld device, the sensors configured to obtain bio-signal data that is selected from a group consisting of galvanic skin response signal data, electromuscular signal data, or electrocardio signal data;
    adjusting a state of the interactive application based on the monitored physiological attribute of the user, wherein adjusting the state of the interactive application includes,
      predicting a future value of the physiological attribute, and
      adjusting the state of the interactive application using the predicted future value of the physiological attribute; and
    wherein adjusting the state of the interactive application includes adjusting a respiration intensity or a respiration rate graphically depicted by a character defined by the interactive application.

11. The method of claim 10, wherein monitoring the physiological attribute includes,
    determining a value of the physiological attribute.

12. The method of claim 11, wherein monitoring the physiological attribute further includes,
    recording the value of the physiological attribute; and
    tracking changes in the value of the physiological attribute.

13. The method of claim 10, wherein adjusting a state of the interactive application includes,
    processing the physiological attribute and the state of the interactive application to determine a relationship between the value of the physiological attribute and the state of the interactive application; and
    adjusting the state of the interactive application according to the value of the physiological attribute based on the relationship between the value of the physiological attribute and the state of the interactive application.

14. The method of claim 13, wherein adjusting the state of the interactive application further includes, determining a stage of the interactivity between the user and the interactive application; and adjusting the state of the interactive application based on the stage of the interactivity between the user and the interactive application.

15. The method of claim 10, wherein adjusting the state of the interactive application provokes a predetermined change in the physiological attribute of the user.

16. The method of claim 10, wherein adjusting the respiration rate graphically depicted by the character includes synchronizing respiration graphically depicted by the character with a respiration of the user.

17. A handheld device for applying biometric input to an interactive application module, comprising,
   a processor;
   at least one input mechanism for receiving intentional input from a user;
   at least one biometric sensor for detecting biometric data of the user;
   a biometric processing module executed by the processor, the biometric processing module receiving the biometric data from the at least one biometric sensor and processing the biometric data to determine a bio-input characteristic, wherein the bio-input characteristic defines a predicted future value of a physiological attribute of the user, the at least one biometric sensor configured to obtain bio-signal data that is selected from a group consisting of galvanic skin response signal data, electromuscular signal data, or electrocardio signal data;
   an interactive application module executed by the processor, the interactive application module receiving the bio-input characteristic and adjusting a state of the interactive application module based on the bio-input characteristic that defines the predicted future value of the physiological attribute, wherein adjusting the state of the interactive application module includes adjusting a color and a correlated ability of a character defined by the interactive application module, wherein adjusting the ability of the character defines a changed functionality of the at least one input mechanism, wherein the interactive application module processes the bio-input characteristic and the state of the interactive application module to determine a relationship between the bio-input characteristic and the state of the interactive application module, and adjusts the state of the interactive application module according to the relationship between the bio-input characteristic and the state of the interactive application module; and
   a display for displaying the interactive application module to a user.

18. The handheld device of claim 17, wherein the at least one input mechanism includes one or more of a button, joystick, directional pad, touch-sensitive device, trackball, and a motion-sensing device.

19. A system for applying biometric input to an interactive application module, comprising,
   a computer, the computer configured to execute an interactive application module and provide output to a display;
   a controller, the controller configured to communicate with the computer, the controller including at least one input mechanism for receiving intentional input from a user,
   and at least one biometric sensor for detecting biometric data of the user;
   the computer further including a biometric processing module, the biometric processing module receiving the biometric data from the at least one biometric sensor and processing the biometric data to determine a bio-input characteristic when the biometric data exceeds a predefined threshold, the at least one biometric sensor configured to obtain bio-signal data that is selected from a group consisting of galvanic skin response signal data, electromuscular signal data, or electrocardio signal data; and
   the interactive application module receiving the bio-input characteristic and adjusting a state of the interactive application module based on the bio-input characteristic, wherein the interactive application module is configured to use a current state of interactivity to predict a future value of the bio-input characteristic, the adjusting of the state of the interactive application module using the predicted future value of the bio-input characteristic.

20. The system of claim 19, wherein the interactive application module processes the bio-input characteristic and the state of the interactive application module to determine a relationship between the bio-input characteristic and the state of the interactive application module, and adjusts the state of the interactive application module according to the relationship between the bio-input characteristic and the state of the interactive application module.

21. The system of claim 19, wherein the at least one input mechanism includes one or more of a button, joystick, directional pad, touch-sensitive device, trackball, and a motion-sensing device.

22. The method of claim 19,
   wherein biometric processing module is configured to store the biometric data and analyze the stored biometric data to generate a model for predicting future values of the bio-input characteristic, the current state of interactivity being applied to the model to predict the future value of the bio-input characteristic.

* * * * *